(12) United States Patent
Zhong et al.

(10) Patent No.: US 11,048,974 B2
(45) Date of Patent: Jun. 29, 2021

(54) EFFECTIVE STRUCTURE KEEPING FOR GENERATIVE ADVERSARIAL NETWORKS FOR SINGLE IMAGE SUPER RESOLUTION

(71) Applicant: Agora Lab, Inc., Santa Clara, CA (US)

(72) Inventors: Sheng Zhong, Santa Clara, CA (US); Shifu Zhou, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 128 days.

(21) Appl. No.: 16/531,748

(22) Filed: Aug. 5, 2019

(65) Prior Publication Data

US 2020/0356810 A1 Nov. 12, 2020

Related U.S. Application Data

(60) Provisional application No. 62/843,795, filed on May 6, 2019.

(51) Int. Cl.
*G06K 9/62* (2006.01)
*G06N 3/08* (2006.01)

(52) U.S. Cl.
CPC ......... *G06K 9/6256* (2013.01); *G06K 9/6228* (2013.01); *G06K 9/6232* (2013.01); *G06N 3/08* (2013.01)

(58) Field of Classification Search
CPC .. G06K 9/6256; G06K 9/6232; G06K 9/6228; G06N 3/08
See application file for complete search history.

(56) References Cited

U.S. PATENT DOCUMENTS

2018/0075581 A1* 3/2018 Shi ................... G06N 3/0472

* cited by examiner

*Primary Examiner* — Chan S Park
*Assistant Examiner* — Daniel C Chang
(74) *Attorney, Agent, or Firm* — Young Basile Hanlon & MacFarlane, P.C.

(57) ABSTRACT

A method of training a generator G of a Generative Adversarial Network (GAN) includes generating a real contextual data set $\{x_1, \ldots, x_N\}$ for a high resolution image Y; generating a generated contextual data set $\{g_1, \ldots, g_N\}$ for a generated high resolution image G(Z); calculating a perceptual loss $L_{pcept}$ value using the real contextual data set $\{x_1, \ldots, x_N\}$ and the generated contextual data set $\{g_1, \ldots, g_N\}$; and training the generator G using the perceptual loss $L_{pcept}$ value. The generated high resolution image G(Z) is generated by the generator G of the GAN in response to receiving an input Z, where the input Z is a random sample that corresponds to the high resolution image Y.

20 Claims, 9 Drawing Sheets

EFFECTIVE STRUCTURE KEEPING FOR GENERATIVE ADVERSARIAL NETWORKS FOR SINGLE IMAGE SUPER RESOLUTION

CROSS-REFERENCE TO RELATED APPLICATION(S)

This application claims priority to and the benefit of U.S. Provisional Application Patent Ser. No. 62/843,795, filed May 6, 2019, the entire disclosure of which is hereby incorporated by reference.

TECHNICAL FIELD

This disclosure relates generally to generative adversarial networks (GANs) and more specifically to the training of a GAN.

BACKGROUND

Machine learning relates to computers learning to perform tasks without explicit instructions. Based on sample data, a computer builds (e.g., infers) a model for performing a task. When presented with new data, the computer uses the model to perform the task. The task can be a classification task, a prediction task, an inference task, and the like.

Generative adversarial networks (GANs) are a class of machine learning systems that can be used to generate new data. For example, GANs can be used to generate new images. For example, in the field of super-resolution, GANs can be used to generate high-resolution images from low-resolution images. For example, in the field of inpainting, GANs can be used to reconstruct lost or deteriorated parts of images and/or videos. GANs can also be used in many other applications, such as for generating realistic domain-specific images (i.e., generating images that look real).

SUMMARY

A first aspect is a method of training a generator G of a Generative Adversarial Network (GAN). The method includes generating a real contextual data set $\{x_1, \ldots, x_N\}$ for a high resolution image Y; generating a generated contextual data set $\{g_1, \ldots, g\}$ for a generated high resolution image G(Z); calculating a perceptual loss $L_{pcept}$ value using the real contextual data set $\{x_1, \ldots, x_N\}$ and the generated contextual data set $\{g_1, \ldots, g_N\}$; and training the generator G using the perceptual loss $L_{pcept}$ value. The generated high resolution image G(Z) is generated by the generator G of the GAN in response to receiving an input Z, where the input Z is a random sample that corresponds to the high resolution image Y.

A second aspect is an apparatus for training a generator G of a Generative Adversarial Network (GAN). The apparatus includes a memory and a processor. The processor is configured to execute instructions stored in the memory to generate a real contextual data set $\{x_1, \ldots, x_N\}$ for a high resolution image Y; generate a generated contextual data set $\{g_1, \ldots, g_N\}$ for a generated high resolution image G(Z); calculate a perceptual loss $L_{pcept}$ value using the real contextual data set $\{x_1, \ldots, x_N\}$ and the generated contextual data set $\{g_1, \ldots, g_N\}$; and train the generator G using the perceptual loss $L_{pcept}$ value. The generated high resolution image G(Z) is generated by the generator G of the GAN in response to receiving an input Z, where the input Z is a random sample that corresponds to the high resolution image Y.

A third aspect is a method for generating a super resolution image. The method includes receiving, by a generator G, an input corresponding to a low resolution image; and outputting, from the generator G, the super resolution image corresponding to the low resolution image. The generator G is trained using a Generative Adversarial Network (GAN) by steps including generating a real contextual data set $\{x_1, \ldots, x_N\}$ for a target high resolution image Y; generating a generated contextual data set $\{g_1, \ldots, g_N\}$ for a generated high resolution image G(Z); calculating a perceptual loss $L_{pcept}$ value using the real contextual data set $\{x_1, \ldots, x_N\}$ and the generated contextual data set $\{g_1, \ldots, g_N\}$; and training the generator G using the perceptual loss $L_{pcept}$ value. The generated high resolution image G(Z) is generated by the generator G of the GAN in response to receiving an input Z that corresponds to the target high resolution image Y.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Deep Neural Networks (DNN) have been utilized in many areas to, inter alia, solve computer vision problems such as image recognition and image generation. Convolutional Neural Networks (CNN), in particular, have been wildly used and have achieved the state-of-the-art results in these areas.

Deep CNN models extract image features through operations such as filtering, striding, pooling and non-linear rectifying. The features become more abstract as the CNN layers get deeper. These features (referred to as latent space features) are fed to the final layers of the network to perform computer vision tasks such as object detection, image classification, image segmentation, image annotation and image generation. Many model architectures have been proposed to improve the performance such as accuracy.

Generative adversarial networks (GANs) can be used to learn the data distribution of, for example, real images. A GAN typically includes two networks: a generator G and a discriminator D. Based on the learning, new images can be generated. More specifically, a generator G of the GAN learns the distribution of real data on the underlying real data, and then attempts to generate samples that look like the real samples.

Figure 3:
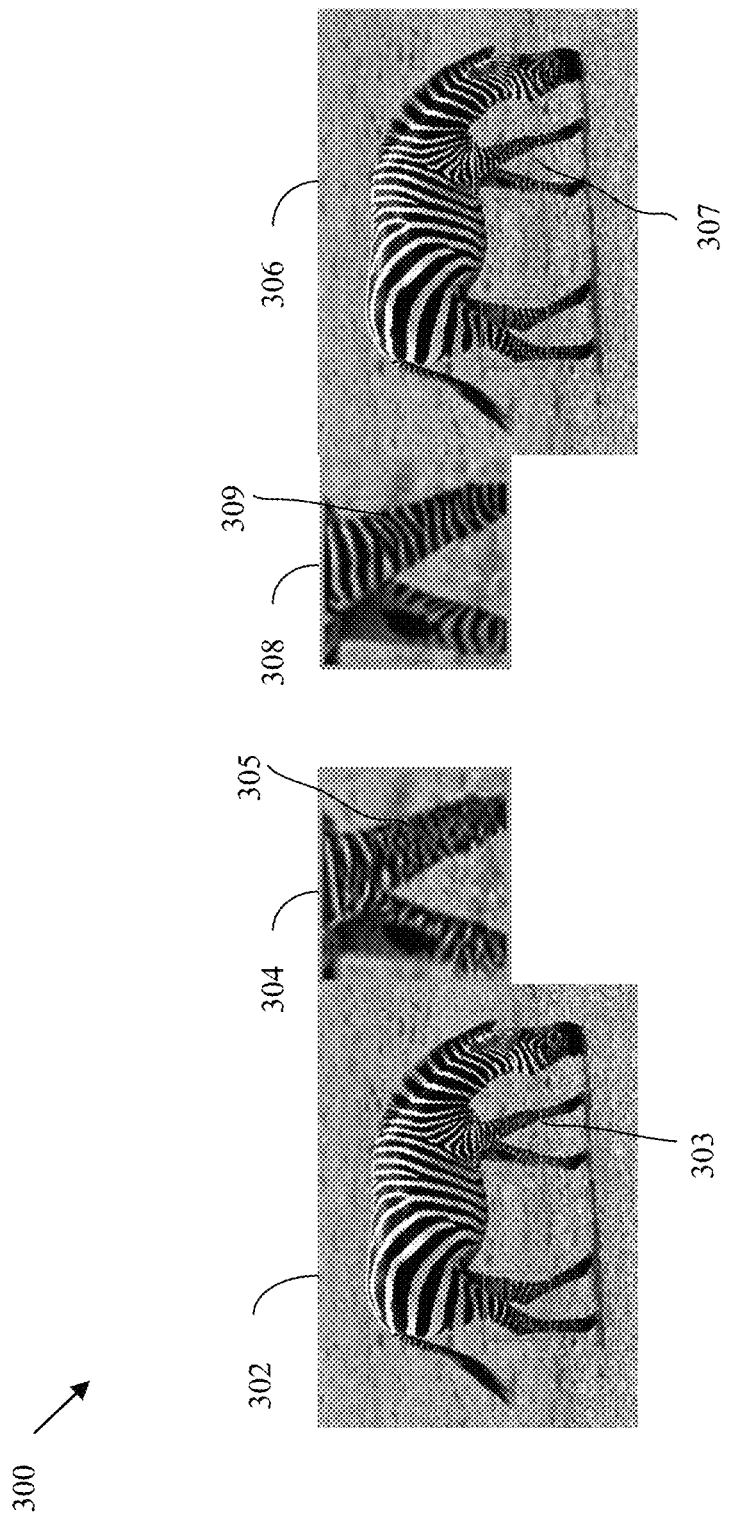
FIG. 3 is an example of a problem with generated data by a GAN.

A problem with GAN networks is that generated data (e.g., generated images) may contain undesirable artefacts, such as distortions or unnatural image structures, such as described with respect to FIG. 3. Implementations and GAN architectures according to this disclosure can be used to eliminate or at least reduce such artefacts. As such, more realistic and artefact-free data can be generated by the generator G.

Implementations and GAN architectures according to this disclosure leverage the Lipschitz continuity condition in the training of GAN architectures according to this disclosure. The Lipschitz continuity condition can be used to introduce an encoder E into a GAN architecture. The encoder E can be used to minimize the latent space differences between a generated sample, G(Z) and a target sample, Y, as further explained below. The latent spaces of G(Z) and Y are denoted, respectively, E(G(Z)) and E(Y). The disclosure herein mainly applies in supervised learning situations. In supervised learning, a real data sample, $y_i$, that corresponds to a generated data $G(z_i)$ is known. That is, the correspondence between a pair of real and generated data samples is known. Said another way, when a new data $G(z_i)$ is generated, it is known what that $G(z_i)$ should look like; namely, $G(z_i)$ should look like a corresponding and known $y_i$. In the case of supervised training, the input sample Z is typically a noisy sample that may contain random noise and/or other distortions or impairments. In the case of unsupervised training, the input sample Z is typically random noise. In this disclosure, the input sample Z may be referred to noisy sample even in the context of supervised training. However, in the context of supervised learning, a sample noise Z should be understood to mean noisy sample Z.

GANs can be used in the field of Super Resolution (SR). For example, GANs can be used to generate high resolution images from a set of low quality, low resolution images or from a single image. Given a low resolution blurry picture, a GAN can generate a high resolution and clear picture with enough detail and sharpness.

Super Resolution applications include the following applications. In visual communication, a sender may send to a receiver a relatively blurred, small picture over a network. Super resolution can be used by the receiver to enhance the picture details and the resolution. For example, If the receiver receives the picture in standard definition (SD), the receiver can restore the image to a high-definition (HD). A picture that is captured using a digital camera with limited picture resolution can be enlarged by using super resolution.

In the case of generating a high resolution image from a single image, the problem is referred to as Single Image Super Resolution (SISR). SISR is a computer vision task that aims at recovering the high-resolution (HR) image based on a single low-resolution (LR) image. Some conventional SISR methods can make use of spatial interpolation based on spatial prediction. Deep neural networks (DNNs) have been applied to the SISR and have achieved many encouraging results. In particular, GANs have been popular in solving the SISR problem.

Many GAN architectures and training strategies optimize objective functions based on the Mean Absolute Error (MAE), the Mean Square Error (MSE), or, equivalently the Peak Signal-to-Noise Ratio (PSNR).

However, such GAN architectures and objective functions tend to produce over-smoothed results without sufficient high-frequency details. This is at least because metrics such as the MAE, the MSE, and the PSNR do not correlate well enough with the subjective perception of human visual systems. Perceptual-based metrics have therefore been developed. Perceptual loss is defined in the feature space, which may also be referred to as the latent space. Minimizing the perceptual loss can significantly improve the visual quality of SISR compared to PSNR-oriented methods.

A problem with such GAN networks and objective functions (e.g., objective functions that minimize the perceptual loss) is that important internal image structures in generated images (i.e., the generated high resolution images) can be distorted or missing, and details can be blurry.

Implementations and GAN architectures (i.e., models) according to this disclosure can use new loss functions that help retain (e.g., maintain, keep, etc.) the important internal image structures in generated high resolution images when the GAN is applied to the SISR problem. As such, more realistic, crisp (i.e., not blurry), and fine-detailed images can be generated by the generator G of the GAN. Metrics that are better suited for preserving visible (i.e., perceptual) structures are described. Such metrics are referred to as structure-keeping perceptual metrics. The structure-keeping perceptual metrics can be combined with other loss items (e.g., metrics, data, etc.) and used as the final loss function of the generator.

The disclosure herein mainly applies in supervised learning situations. In supervised learning, a real data sample, $y_i$, that corresponds to a generated data $G(z_i)$ is known. That is, the correspondence between a pair of real and generated data samples is known. Said another way, when a new data $G(z_i)$ is generated, it is known what that $G(z_i)$ should look like; namely, $G(z_i)$ should look like a corresponding and known $y_i$.

Throughout, a generator may be referred as G, a generator, or a generator network; a discriminator, may be referred to as D, a discriminator, or a discriminator network; and an encoder may be referred as E, an encoder, or an encoder network.

Effective structure keeping for generative adversarial networks for single image super resolution is described herein first with reference to a system, architecture, or environment in which the teachings can be incorporated.

Figure 1:
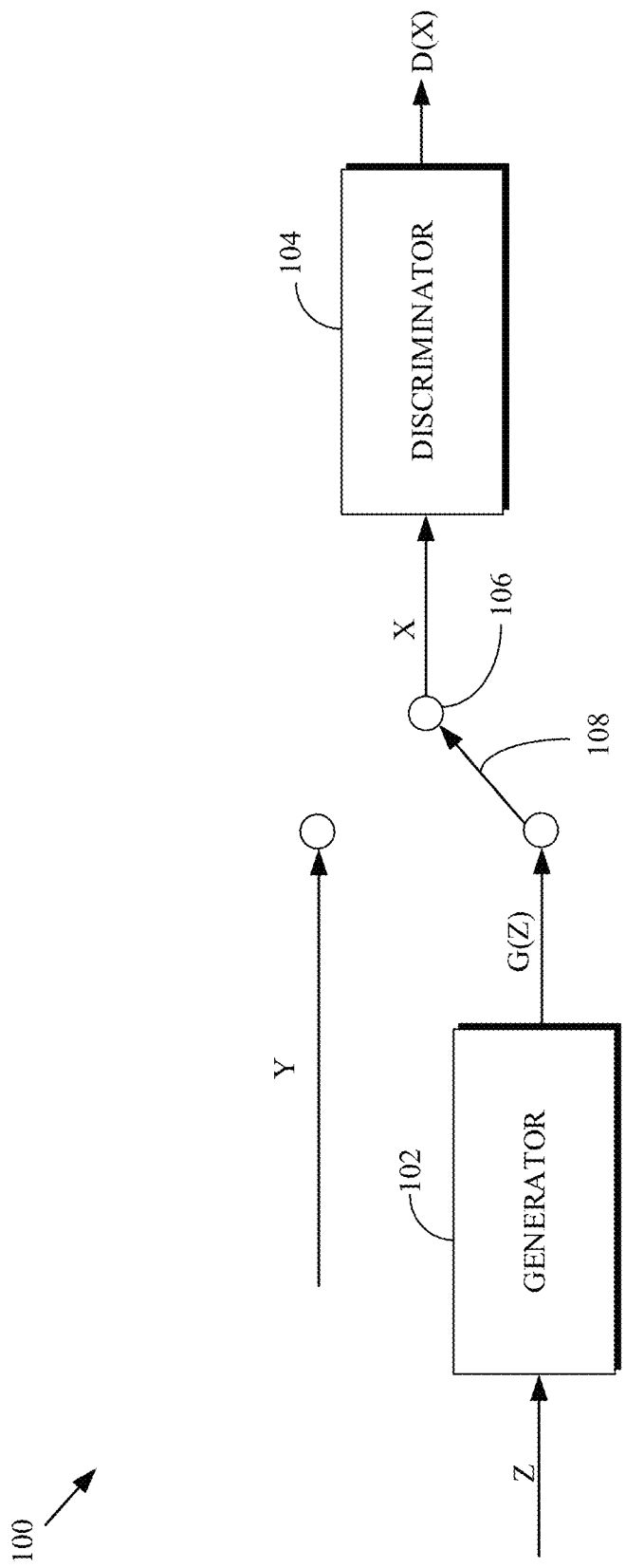
FIG. 1 is an example of a generic generative adversarial network (GAN).

FIG. 1 is an example of a generic generative adversarial network (GAN) 100. The GAN 100 includes a generator 102 and a discriminator 104. A purpose of the GAN 100 is such that, through training (i.e., after the training is complete), the generator 102 can generate realistic data (e.g., generated, realistic images of faces) such that the discriminator 104 cannot tell that the data is generated. That is, the discriminator 104 considers (i.e., is fooled into considering) the generated data to be real data.

The generator 102 can be an inverse convolutional network that receives a vector of random noise, Z, and up-samples the noise, Z, to generate the generated data (e.g., generated image), G(Z). The generator 102 can be thought of as a function that maps the input Z to an output G(Z). The discriminator 104 can be a convolutional network that can categorize the input that is fed to it, along an input 106, into as either real or fake (i.e., generated).

In an example, given an input X, the discriminator 104 outputs a label, D(X), indicating whether the input X is real or generated. The discriminator 104 can be binomial classifier that can label (e.g., classify) an input X as real or generated. For example, D(X) can be 0 if the discriminator 104 determines that the input X is generated; otherwise D(X) can be 1. Other output values can be possible. In another example, D(X) can be a probability value.

As illustrated by a switch 108, the discriminator 104 can receive, as an input X, either the output G(Z) of the generator 102 or a real data sample Y. When the discriminator 104 receives G(Z) as input (i.e., when X=G(Z)), the output of the discriminator 104 is a value, D(G(Z)), indicating whether the discriminator 104 considers the input G(Z) to be real or generated. When the discriminator 104 receives Y as input (i.e., when X=Y), the output of the discriminator 104 is a value, D(Y), indicating whether the discriminator 104 considers the input Y to be real or generated.

The generator 102 and the discriminator 104 networks can be thought of as working together and, at the same time, working against each other. Colloquially, the generator 102 can be thought of a counterfeiter and the discriminator 104 can be thought of as a cop. The counterfeiter's purpose (during the training) is to generate data such that the cop cannot recognize that the generated data are counterfeit.

The generator 102 is trained to maximize the probability D(G(Z)) to fool the discriminator 104 so that the discriminator 104 is not able to tell G(Z) is generated. The discriminator 104 is trained to minimize the probability D(G(Z)) and maximize the probability D(Y) so that the generated sample G(Z) can be distinguished from a real data sample Y. When a real input Y is fed into the discriminator 104, the goal of the discriminator 104 is to output, for example, a probability D(X)=1; and to output a D(X)=0 if the input is generated (e.g., G(X)). Again, D(X) can be the probability that the input X is real (i.e., P(class of input=real data)).

The end result is that when both the generator 102 and the discriminator 104 converge, the discriminator 104 can no longer distinguish the generated sample G(Z) from a real data sample Y. At this point, the generator 102 can be regarded as having learned the distribution of the real data Y. By convergence is meant that additional training of either of the generator 102 and/or the discriminator 104 does lead to improved (or sufficiently improved) performance.

Backpropagation can be used to improve the performance of each of the generator 102 and the discriminator 104 networks.

As mentioned, the discriminator 104 can output a value D(x) indicating the chance that the input X is a real data sample. The objective of the discriminator 104 is to maximize the chance of recognizing real data samples (i.e., Y) as real and the chance of recognizing that generated samples (i.e., G(Z)) as fake (i.e., generated). That is, the goal of the discriminator 104 is to maximize the likelihood of the inputs. To measure the loss, cross-entropy, p log(q), can be used. Optimizing the weights $\theta_D$ of the discriminator 104 can be expressed by the optimization problem of equation (1):

$$\theta_D^* = \arg_{\theta_D} \max_{\theta_D} EP_y[\log D_{\theta_D}(y)] + EP_z[\log(1-D_{\theta_D}(G_{\theta_G}(z)))] \quad (1)$$

In equation (1), $EP_y$ means the expectation value with respect to the distribution of variable Y (i.e., a real data sample), $EP_z$ means the expectation value with respect to the distribution of variable Z (i.e., the random noise from which G(Z) is generated), and $\theta_D$ and $\theta_G$ are the current network weight parameters of the discriminator 104 (D) and the generator 102 (G) respectively. $D_{\theta_D}(y)$ is the output of the discriminator 104 given the current discriminator network parameters $\theta_D$ when the input Y (i.e., a real data sample) is presented to the discriminator 104. $D_{\theta_D}(G_{\theta_G}(z))$ is the output of the discriminator 104 given the current discriminator network parameters $\theta_D$ when the input $G_{\theta_G}(z)$ (which, in turn, is the output of the generator 102 given the current generator network parameter $\theta_G$ when the input z is presented to the generator 102) is presented to the discriminator 104.

The equation (1) (i.e., the objective function of the discriminator 104) can be summarized as: find a new set of discriminator network parameters, $\theta_D^*$, that maximizes the ability of the discriminator 104 to recognize real data samples better (i.e., corresponding to the term $EP_y[\log D_{\theta_D}(y)]$) and to recognize generated data samples better (i.e., corresponding to the term $EP_z[\log(1-D_{\theta_D}(G_{\theta_G}(z)))]$).

Training the generator 102 can also be via backpropagation. The objective function of the generator 102, as mentioned above, can be such that the generator 102 generates data (e.g., images) with the highest possible value of D(x) to fool the discriminator 104. As such, the objective function of the generator G can be given by equation (2):

$$\theta_G^* = \arg_{\theta_G} \min_{\theta_G} EP_z[\log(1-D_{\theta_D}(G_{\theta_G}(z)))] \quad (2)$$

$EP_z$ and $D_{\theta_D}(G_{\theta_G}(z))$ are as described with respect to equation (1). Equation (2) can be summarized as: Find the optimal parameters of the generator 102, G, so that an output G(Z) of the generator 102 can fool the discriminator 104 the most.

The equations (1) and (2) can be combined into the minmax optimization problem:

$$(\theta_G^*, \theta_D^*) = \arg_{(\theta_G, \theta_D)} \min_{\theta_G} \max_{\theta_D} EP_y[\log D_{\theta_D}(y)] + EP_z[\log(1-D_{\theta_D}(G_{\theta_G}(z)))]$$

In an example, the objective functions of equations (1) and (2) can be learned jointly, such as by alternating gradient ascent and descent of the discriminator 104 and the generator 102, respectively. For example, the parameters, $\theta_G$, of the generator 102 can be fixed and a single iteration of gradient ascent on the discriminator 104 can be performed using the real (i.e., Y) and the generated (i.e., $G_{\theta_G}(z)$) data samples; then the parameters, OD, of the discriminator 104 are fixed and the generator 102 can be trained for another single iteration of gradient descent. The discriminator 104 and the generator 102 networks can be trained in alternating steps until the generator 102 produces samples, G(Z), that the discriminator 104 cannot recognize as generated samples.

Figure 2:
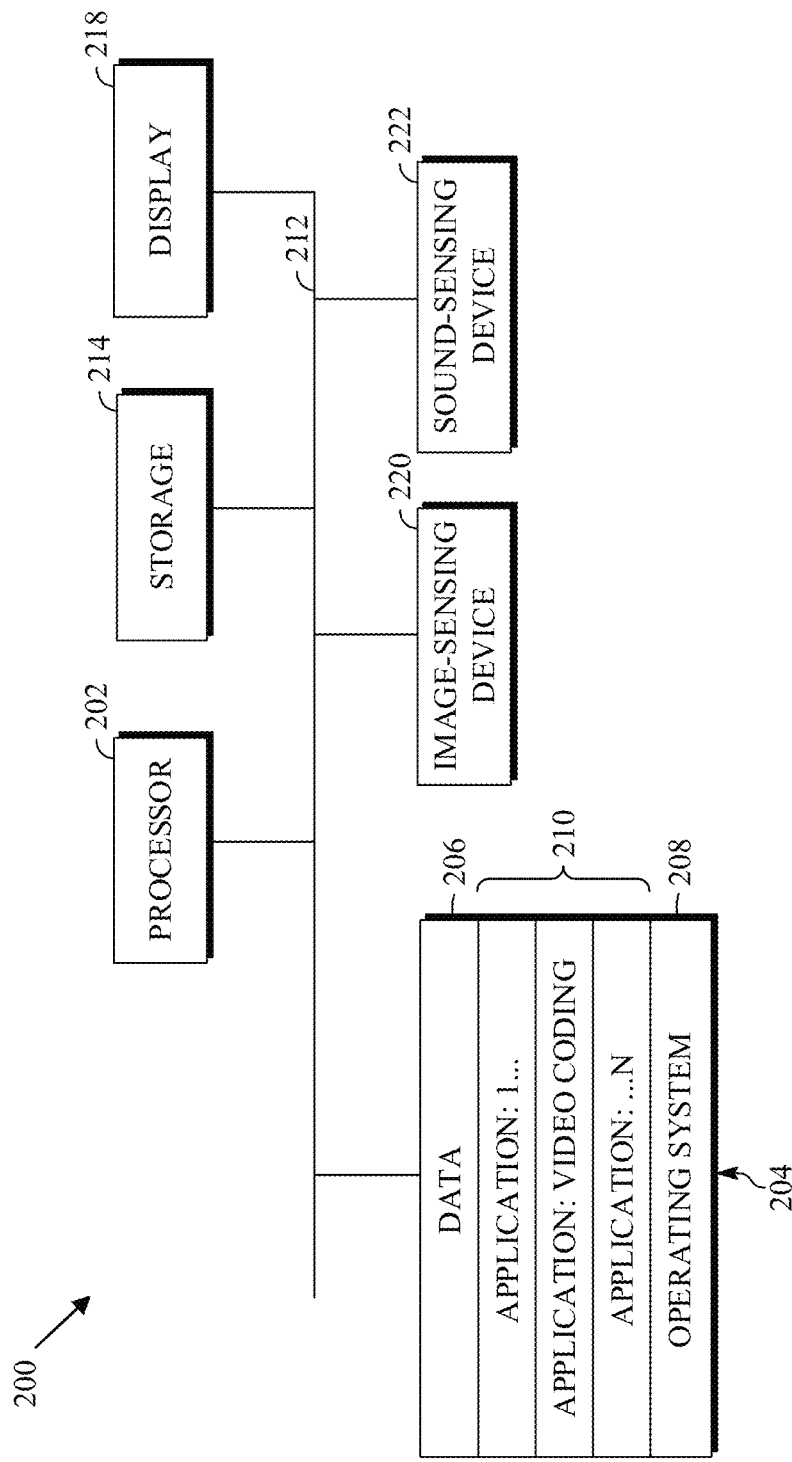
FIG. 2 is a block diagram of an example of a computing device that can implement a neural network.

FIG. 2 is a block diagram of an example of a computing device 200 that can implement a neural network. The neural network can be a convolutional neural network. For example, the computing device 200 can implement one or both of the generator 102 and the discriminator 104 of FIG. 1. The computing device 200 can implement an encoder, E, as further described below. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions can contain a significant amount of information, they can be stored in whole or in part in the secondary storage 214 and loaded into the memory 204 as needed for processing.

The computing device 200 can also include one or more output devices, such as a display 218. The display 218 can be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

As already mentioned, GAN models have become popular for image processing tasks, such as super resolution, image to image translation, image or video style transfer, inpainting, and other applications. However, there are some inherent problems in GAN models. Examples of such problems include mode collapse and distortion. Mode collapse refers to situations where multiple inputs map to one output when the different inputs are expected/intended to result in different outputs. For example, given a bimodal distribution of data with 2 Gaussians concentrated at two points, the GAN may learn only one of the modes. As such, regardless of the input to the generator, the output would map to the one of the Gaussian distributions that is learnt.

For example, when a generator, such as the generator 102 of FIG. 1, is applied to generate images that mimic natural images as in the computer vision task of single image super resolution, even with supervised training for the generator network, the generated image may look unreal, distorted, and/or lack details. FIG. 3 is an example of a problem 300 with generated data by a GAN.

An image 306 is a ground truth, high resolution image of a zebra. The image 306 includes a patch 307 showing clear structures. The patch 307 is shown in a zoomed patch 308. The zoomed patch 308 illustrates that stripes 309 are natural, clear, and undistorted. Contrastingly, an image 302 is a GAN-generated super resolved high resolution image of the image 306. A patch 303 of the image 302 corresponds to the patch 307 of the image 306. The patch 303 is shown in a zoomed patch 304. As can be seen, stripes 305, which correspond to the stripes 309, contain distorted internal structures. The zebra stripes in the zoomed patch 304 are not structured.

As such, it is desirable that data (e.g., images) generated by a generator of a GAN not include artefacts, such as distortions and/or unnatural structures. Generating images with less artefacts can improve the learning performance of the GAN. That is, the more realistic the generated data, the quicker the GAN can converge to optimal solutions to equations (1) and (2).

Figure 4:
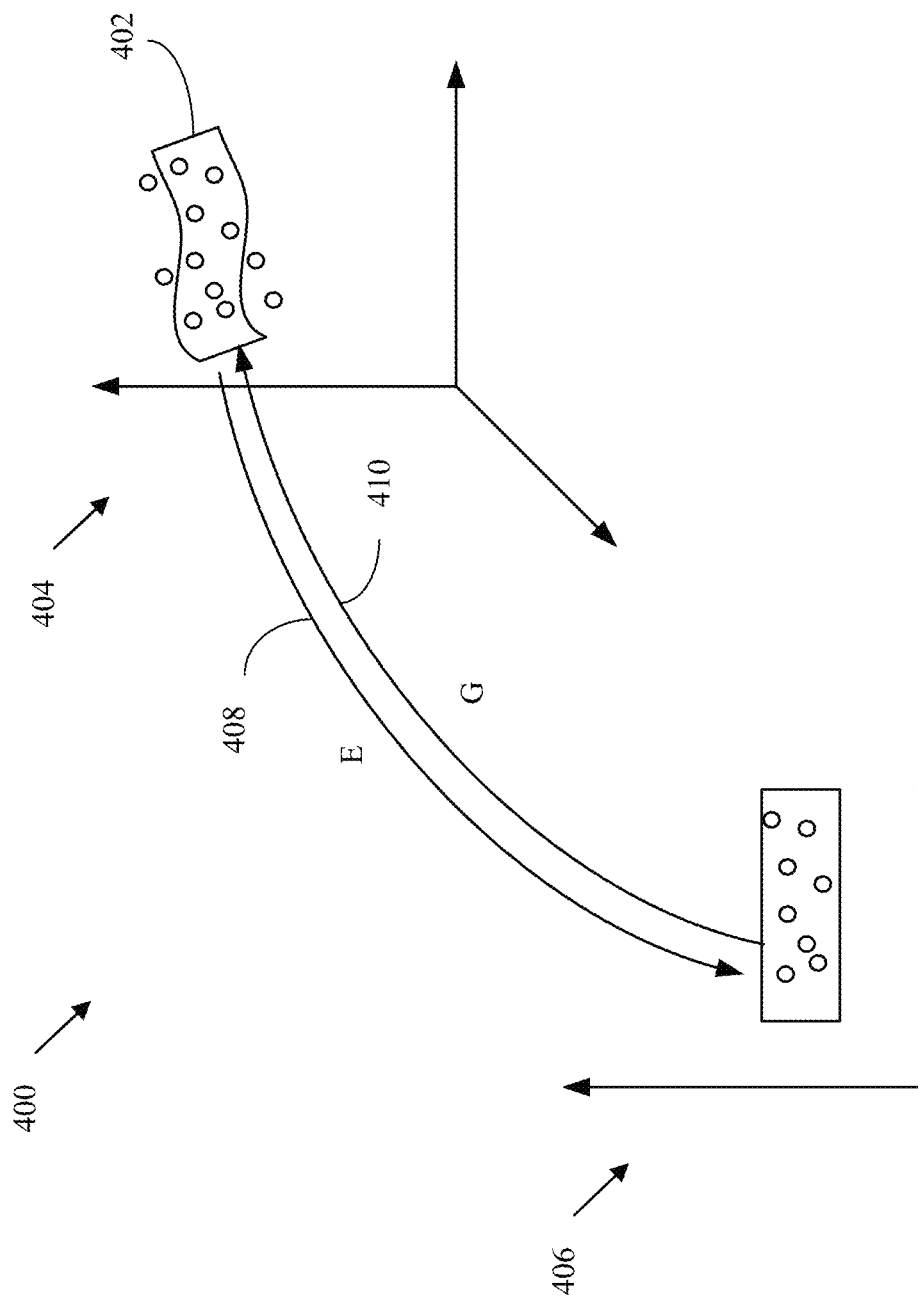
FIG. 4 is an illustration of an image manifold and a latent space of the image manifold.

Natural images can be regarded as residing in a manifold embedded in a high dimensional space (also called the ambient space). FIG. 4 is an illustration 400 of an image manifold and a latent space of the image manifold. A manifold 402 is illustrated. The manifold 402 is usually of lower dimensionality than that of the ambient space. An ambient space 404 is illustrated, for ease of visualization, as a 3-dimensional space. In general, the ambient space 404 can be thought of as being m-dimensional. For ease of visualization, the manifold 402 is illustrated as being mapped to a two-dimensional latent space, a latent space 406. However, in general, the manifold 402 can be thought of as being n-dimensional, where $n \leq m$.

The manifold 402 can be mapped, as illustrated by an arrow 408, to the lower dimensional space (i.e., the latent space 406) via an encoding map E (i.e., an encoder E). The lower dimensional space can be called the latent space. The reverse mapping, illustrated by an arrow 410, from the latent space 406 to the ambient space 404 is the generator function G. That is, a generator, such as the generator 102 of FIG. 1, can generate a data sample in the ambient space 404. The two spaces (i.e., the ambient space 404 and the latent space 406) are homeomorphic, in mathematical terms. As such, the encoder E and the generator G are homeomorphisms. That is, the image manifold 402 can be homeomorphic between the generator and the encoder spaces. Under this homeomorphism, at least theoretically, the two spaces are equivalent. One space can be mapped to the other using the corresponding generator function or the encoding function.

Different classes of natural images reside in different neighborhoods of the manifold. It is desirable that each data sample (e.g., each image) that is generated (i.e., by a generator, such as the generator 102 of FIG. 1) be located in a close vicinity of the target neighborhood. That is, for example, it is desirable that the generated data sample G(Z) of FIG. 1 be as close as possible to the target Y of FIG. 1.

To achieve this, implementations according to this disclosure can use a new GAN architecture that imposes regularizations from the latent space. An encoder E can be combined with a GAN, such as the GAN 100 of FIG. 1. New loss functions are used to train GAN models according to this disclosure.

Latent space regularization is now explained. As explained with respect to FIG. 4, a collection of, for example, N×M-sized natural images can reside in a manifold, such as the manifold 402, embedded in an N*M dimensional space, such as the ambient space 404. If the images in the collection are effectively parameterized by a small number of continuous variables, then the collection of images will lie on or near a low dimensional manifold in this high dimensional space.

As is known, before a neural network can be used for a task (e.g., classification, regression, image reconstruction, etc.), the neural network is trained to extract features through many layers (convolutional, recurrent, pooling, etc.). The neural network becomes (e.g., learns) a function that projects (e.g., maps) the image on the latent space. In other words, the latent space is the space where the features lie. The latent space contains a compressed representation of the image. This compressed representation is then used to reconstruct an input, as faithfully as possible. To perform well, a neural network has to learn to extract the most relevant features (e.g., the most relevant latent space).

Given any two samples $z_1$ and $z_2$ in the latent space (i.e., $z_1$ and $z_2$ used as inputs to a generator, such as the generator 102 of FIG. 1), the generated samples in the ambient space are $G(z_1)$ and $G(z_2)$ (i.e., $G(z_1)$ and $G(z_2)$ are the respective outputs of the generator). The inequality (3) can be imposed on the generator function.

$$|G(z_1)-G(z_2)| \leq k^*|z_1-z_2| \qquad (3)$$

The inequality (3) expresses that the absolute change (i.e., $|G(z_1)-G(z_2)|$) of the function G (i.e., the output of a generator G) can be upper bounded by a constant multiple, k, of the absolute latent space difference (i.e., $|z_1-z_2|$). The constant, k, is referred to as the Lipschitz constant. That is, the Lipschitz continuity condition is applied to the generator such that the variation of the function (i.e., the output of the generator) is upper bounded by the variation of the inputs to the generator. By applying the Lipschitz continuity condition, the variation of the pictures can be well controlled; that is, the variation of the function G can be well controlled.

In the case of supervised learning (i.e., when desired target Y corresponding to an input Z to the generator is known), G(z) is expected to be (e.g., desired to be) close to the target Y. The difference between the generator G(Z) and the target Y can be required to be upper bounded by the latent space difference.

Directly bounding the difference of the output of the generator (i.e., $|G(z_1)-G(z_2)|$) by the difference of the inputs (i.e., $|z_1-z_2|$) is not valid because the inputs (e.g., $z_1$ and $z_2$) are usually random and/or corrupted by random noise or other impairments.

An additional encoding map E (i.e., an encoder E) can be explicitly added. The encoding map E can map the ambient space to a new latent space. The Lipschitz condition can be applied to both the generator G and the encoder E, as further described below. The Lipschitz condition is expressed by the inequality (4).

$$|Y-G(Z)| \leq k^*|E(Y)-E(G(Z))| \qquad (4)$$

In the inequality (4), Y is a real data sample and G(Z) is the output of the generator corresponding to Y. That is, given input Z, the generator is expected to output a G(Z) that is as close as possible to Y. E(Y) and E(G(Z)) are the latent space points mapped from the ambient space by the encoder E. Inequality (4) can stated as: Given a target sample Y, then it is desirable to make the difference between Y and the generated data, G(Z), be upper bounded by latent space variables. It is noted that the absolute differences used herein (such as $|Y-G(Z)|$), $|E(Y)-E(G(Z))|$, etc.) mean the $L_1$-norms, unless otherwise stated. However, this disclosure is not so limited and, as such, another norm or other error measurements can be used. For example, the error can be the mean squared error.

To reiterate, based on the inequality (4), Y can be approximated by G(Z) more closely, if the E(Y) and the E(G(Z)) are themselves close enough. A reason for using the inequality (4) instead of the inequality (3) is that as Z is known to generally be noisy, Z may contain distortion and/or other artefacts. Directly bounding the difference of the generator function, G, by a noisy input difference is not a good idea.

The encoder E maps an original (e.g., target) sample (e.g., image), Y, and/or the generated data (e.g., image), G(Z), which are in the high dimension of the ambient space, into another low dimension space, the latent space. Such mapping is denoted as E(Y), for Y, and E(G(z)), for G(Z).

As described with respect to FIG. 1, a typical GAN architecture includes only a generator and a discriminator. As such, the typical GAN architecture does not include an encoder E, as described above.

Figure 5:
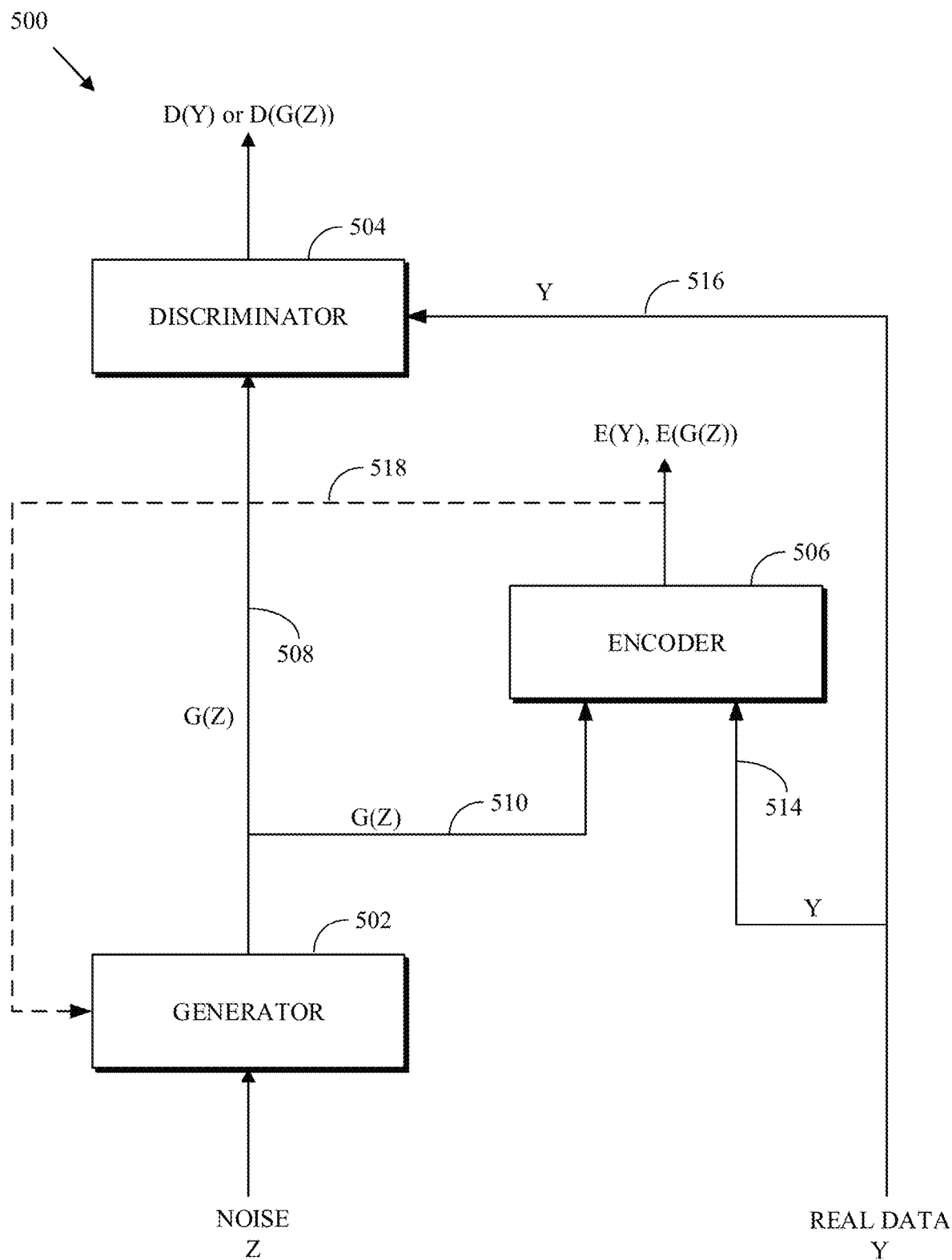
FIG. 5 is an example of a GAN architecture that includes an encoder according to implementations of this disclosure.

FIG. 5 is an example of a GAN architecture 500 that includes an encoder according to implementations of this disclosure. The GAN architecture 500 includes a generator 502, a discriminator 504, and an encoder 506. The generator 502 can be as described with respect to the generator 102 of FIG. 1, with the exception that the objective function of the generator 502 is different from that of the generator 102 as described herein. The discriminator 504 can be as described with respect to the discriminator 104 of FIG. 1. The encoder 506 can be a neural network, such as a convolutional neural network. For example, the encoder 506 can be adapted from the first few layers of a typical VGG model such as the VGG16, and/or followed by a few upscaling layers so that the output of the encoder 506 can match the size of noisy sample Z (i.e., the input to the generator 502). VGG and VGG16 are named after the Visual Geometry Group at Oxford University and are described in Karen Simonyan, Andrew Zisserman (2015), VERY DEEP CONVOLUTIONAL NETWORKS FOR LARGE-SCALE IMAGE RECOGNITION. ICLR 2015. Retrieved from https://arxiv.org/pdf/1409.1556.pdf%20http://arxiv.org/abs/1409.1556.pdf and is incorporated herein in its entirety. The encoder 506 can be implemented by or executed by a computing device (i.e., an apparatus), such as the computing device 200 of FIG. 2.

As described above with respect to FIG. 1, the generator 502 can receive as input an input Z and output a generated sample G(Z). The input Z can be a random value that is As described above with respect to FIG. 1, the generator 502 can receive as input an input Z and output a generated sample G(Z). The input Z can be a random value that is sampled from a distribution (such as a uniform distribution), p(z). The input Z can include multiple components. That is, the input Z can be a multi-dimensional (e.g., a J-dimensional) vector of random values. Via training, the generator learns a mapping from the random noise Z to the ambient space G(Z). As such, G(Z) is the ambient space representation of the random input Z.

The discriminator 504 can receive either the generated sample G(Z) along a path 508 or receive, along a path 516, a target Y corresponding to G(Z). When the discriminator 504 receives G(Z), the discriminator 504 outputs a value D(G(Z)) indicating whether the discriminator 504 determined the G(Z) to be real or generated. When the discriminator 504 receives Y, the discriminator 504 outputs a value D(Y) indicating whether the discriminator 504 determined the input Y to be real or generated.

The encoder 506 also receives as input the target Y, along a path 514, and the generated sample, G(Z), along a path 510. When the encoder 506 receives G(Z), the encoder 506 outputs a value E(G(Z)). When the encoder 506 receive Y, the encoder 506 outputs a value E(Y).

The encoder 506 can be thought of as encoding the salient (e.g., important) features of an original image and those of a corresponding, generated image, into a usually smaller space of the features, and minimizing the difference between those two encodings while applying the inequality (4), which is reflected, as further described below and as illustrated by a dashed line 518, in the optimization of the of the GAN model that includes the encoder 506.

Accordingly, the generator 502 optimization problem of equation (2) can be reformulated (i.e., restated) as equation (5)—that is, the optimization problem of equation (2) has to satisfy the Lipschitz continuity condition with respect to the encoding map (i.e., the encoder 506).

$$\begin{cases} \theta_G^* = \arg_{\theta_G} \min_{\theta_G} EP_z[\log(1 - D_{\theta_D}(G_{\theta_G}(z)))] \\ \text{subject to } |Y - G_{\theta_G}(Z)| \le k * |E_{\theta_E}(Y) - E_{\theta_E}(G_{\theta_G}(Z))| \end{cases} \quad (5)$$

In equation (5), k is a constant and $\theta_G$ is the current set of weights of the generator 502 network; $\theta_E$ is the current set of weights of the encoder 506 network; and EP represents the expectation with respect to the distribution of the noisy input sample Z. $\theta_G^*$ is the new set of weights of the generator network resulting from the optimization problem of equation (2).

Mathematically, the equation (5) can be re-written as equation (6) (since a solution for the equation (5) must be a solution for the equation (6)), in which the Lipschitz constraint is added as a term to (i.e., incorporated into) the generator objective function (i.e., equation (2)):

$$\theta_G^* = \underset{\theta_G}{\operatorname{argmin}} EP_z \left[ \begin{array}{c} \log(1 - D_{\theta_D}(G_{\theta_G}(Z))) + \\ \mu(|Y - G_{\theta_G}(Z)| - k * |E_{\theta_E}(Y) - E_{\theta_E}(G_{\theta_G}(Z))|) \end{array} \right] \quad (6)$$

The equation (6) can be converted to equation (7) by introducing hyperparameters $\mu_1$ and $\mu_2$, where $\mu_1 > 0$ and $\mu_2 > 0$. The hyperparameter $\mu_1$ can be the same as the parameter y of equation (6); and the hyperparameter $\mu 2$ can be equal to $\mu * k$. The hyperparameters $\mu_1$ and $\mu_2$ can be set using heuristics and/or can be derived empirically.

$$\theta_G^* = \underset{\theta_G}{\operatorname{argmin}} EP_z \left[ \begin{array}{c} \log(1 - D_{\theta_D}(G_{\theta_G}(Z))) + \\ \mu_1 * |Y - G_{\theta_G}(Z)| - \mu_2 * |E_{\theta_E}(Y) - E_{\theta_E}(G_{\theta_G}(Z))| \end{array} \right] \quad (7)$$

As already mentioned above, the outputs E(G(Z)) and E(Y) of the encoder 506 are used by the generator 502 as part of the loss function of the generator 502, as shown in equation (7) and as illustrated by the dashed line 518. As also already mentioned, the encoder 506 is trained to minimize the absolute difference between E(G(Z)) and E(Y).

The GAN 500 model can be formulated by the below equations (8)-(10). During training, the discriminator 504, the generator 502, and the encoder 506 are trained alternately. The discriminator 504 can be trained to maximize the function in (8), as in the GAN 100 of FIG. 1. The generator 502 and the encoder 506 are trained to minimize the loss functions in (9) and (10), respectively. Note that equation (8) is the same as equation (1) and equation (9) is the same as equation (7). As illustrated by equation (10), the encoder 506 optimizes the difference between E(Y) (i.e., the latent space presentation of the real sample) and E(G(Z)) (i.e., the latent space representation of the generated, by the generator 502, sample).

$$\theta_D^* = \arg_{\theta_D} \max_{\theta_D} EP_y[\log D_{\theta_D}(y)] + EP_z[\log(1 - D_{\theta_D}(G_{\theta_G}(z)))] \quad (8)$$

$$\theta_G^* = \underset{\theta_G}{\operatorname{argmin}} EP_z \left[ \begin{array}{c} \log(1 - D_{\theta_D}(G_{\theta_G}(z))) + \\ \mu_1 * |Y - G_{\theta_G}(Z)| - \mu_2 * |E_{\theta_E}(Y) - E_{\theta_E}(G_{\theta_G}(Z))| \end{array} \right] \quad (9)$$

$$\theta_E^* = \underset{\theta_E}{\operatorname{argmin}} EP_z[|E_{\theta_E}(Y) - E_{\theta_E}(G_{\theta_G}(Z))|] \quad (10)$$

Using the set of weights $\theta_E$ of the encoder 506, when G(Z) is fed (i.e., input) into the encoder 506, the encoder 506 outputs E(G(Z)). Using the same set of weights $\theta_E$, when Y is fed (i.e., input) into the encoder 506, the encoder 506 outputs E(Y). That is, the same set of weights are used for generating E(G(Z)) and E(Y). In some implementations, where parallel processors may be available, G(Z) and Y may be input into the encoder 506 to output E(G(Z)) and E(Y). Again, G(Z) is the generated sample that corresponds to the sample Y. That is, G(Z) is expected to look a lot like Y.

Feeding both G(Z) and Y to the encoder 506 can constitute one iteration. The weights of the encoder 506 are not updated within one iteration. The weights are updated after one or more complete iterations.

While the proposed constraints of equations (4) and (5) are described with respect to a particular generator objective function (e.g., equation (2)) and a particular discriminator objective function (e.g., equation (1)), the disclosure herein is not so limited. The constraints in equations (4) or (5) can be applicable when other forms of the discriminator function and the generator adversarial function other than the ones in equations (1) and (2) are used. For example, equation (4) can be used along with the Wasserstein distance, the Relativistic discriminator, or some other objective functions, which are used instead of equations (1) and (2). The Wasserstein distance is described in Arjovsky, M., Chintala, S. & Bottou, L. (2017). Wasserstein Generative Adversarial Networks. *Proceedings of the 34th International Conference on Machine Learning, in PMLR* 70:214-223. The Relativistic discriminator is described in Jolicoeur-Martineau, A.: The relativistic discriminator: a key element missing from standard gan. arXiv preprint arXiv:1807.00734 (2018). As can be appreciated, the equations (8)-(10) are be updated depending on the objective functions used.

The pseudocode of Table I illustrates an example of a training algorithm of GANs that include an encoder, such as the GAN 500 of FIG. 5.

TABLE I

0 Network weight parameters $\theta_D$, $\theta_E$ and $\theta_G$ are first randomly initialized.
1 For N training iterations do
2  For L steps do
3   Sample mini-batch of m noise samples $\{z_1, \ldots, z_m\}$ from noise prior $p_g(z)$.
    The corresponding m target samples are $\{y_1, \ldots, y_m\}$.
4   Update the discriminator D by ascending its stochastic gradient:

$$\nabla_{\theta_D} \frac{1}{m} \sum_{i=1}^{m} [\log(D_{\theta_D}(y_i)) + \log(1 - D_{\theta_D}(G_{\theta_G}(z_i)))]$$

5  End for
6  Sample mini-batch of m noise samples $\{z_1, \ldots, z_m\}$ from noise prior $p_g(z)$. The
   corresponding m target samples are $\{y_1, \ldots, y_m\}$.
7  Update the generator G by descending its stochastic gradient:

$$\nabla_{\theta_G} \frac{1}{m} \sum_{i=1}^{m} [\log(1 - D_{\theta_D}(G_{\theta_G}(z_i))) + \mu_1 * |y_i - G_{\theta_G}(z_i)| - \mu_2 * |E_{\theta_E}(y_i) - E_{\theta_E}(G_{\theta_G}(z_i))|]$$

8  Update the encoder E by descending its stochastic gradient:

$$\nabla_{\theta_E} \frac{1}{m} \sum_{i=1}^{m} |E_{\theta_E}(y_i) - E_{\theta_E}(G_{\theta_G}(z_i))|$$

9 End For

Table I illustrates that the GAN model can be trained in N iterations. Each of the discriminator network (i.e., the discriminator 504 of FIG. 5), the generator network (i.e., the generator 502 of FIG. 5), and the encoder network (i.e., the encoder 506 of FIG. 5) are trained, in that order, in one iteration. That is, one iteration involves the training of the three networks: the discriminator, the generator, and the encoder. As an initialization step (i.e., row 0 of Table I), the weights $\theta_D$, $\theta_E$ and $\theta_G$ of, respectively, the discriminator, the encoder, and the generator networks are initialized to random values.

A first Loop of L steps (consisting of rows 2-5 in Table I) describes the training of the discriminator network. In some implementations, L is 1. In other implementations, L can be larger than 1. As such, the discriminator network can be optimized 1 or more times, depending on the value of L.

In each iteration, at row 3 of Table I, a mini-batch of m noisy sample $\{z_1, \ldots, z_m\}$, can be selected using the noisy data-generating distribution $p_g(z)$. As supervised learning is described herein, there are corresponding m target samples, corresponding to each of the input samples. That is, for the input $z_i$ there is a desired output of $y_i$. Next, at row 4 of Table I, the discriminator weights, $\theta_D$, are updated by the gradient ascent (since, as shown in equation (8), updating the discriminator weights is a maximization optimization problem). The details of gradient ascent (and descent) are not described herein as their details are known to a person skilled in the art and an understanding thereof is not necessary to the understanding of this disclosure. As is known, ascending (or descending) a stochastic gradient (as described with respect to Table I and elsewhere in this disclosure) means ascending (or descending) at least a portion of the gradient. Usually, a portion of the gradient is used for the ascending (or descending).

After the L steps of training the discriminator, the algorithm of Table I proceeds to update the generator and the encoder networks. At row 6 of Table I, another mini-batch (i.e., a set) of noise samples $\{z_1, \ldots, z_m\}$ that are sampled using the noisy data-generating distribution $p_g(z)$, and the corresponding desired targets $\{y_1, \ldots, y_m\}$ are selected. Again, as supervised learning is described herein, each $z_i$ corresponds to a $y_i$.

At row 7 of Table I, the generator parameters, $\theta_G$, are updated using by the right hand side of equation (9). That is, the updated parameters can be obtained by descending the stochastic gradient of the right hand side of equation (9). Simultaneously, or subsequently, at row 8 of Table I, the encoder parameters, $\theta_E$, are updated by descending its gradient, which is calculated based on the right hand side equation (10).

The above described process completes one iteration of updating the respective parameters of the for discriminator, generator, and encoder networks. The process can be repeated N times, where N can be a sufficiently large enough number so that the GAN network converges. N can also be set empirically. In an example, the algorithm may not execute N times; rather the algorithm may include a termination condition that terminates the algorithm when it is determined that performance of the GAN network is no longer improving sufficiently. In an example, the discriminator can be trained after the encoder and the generator. As such, the rows 2-5 can be after the rows 6-9 in Table I.

Figure 6:
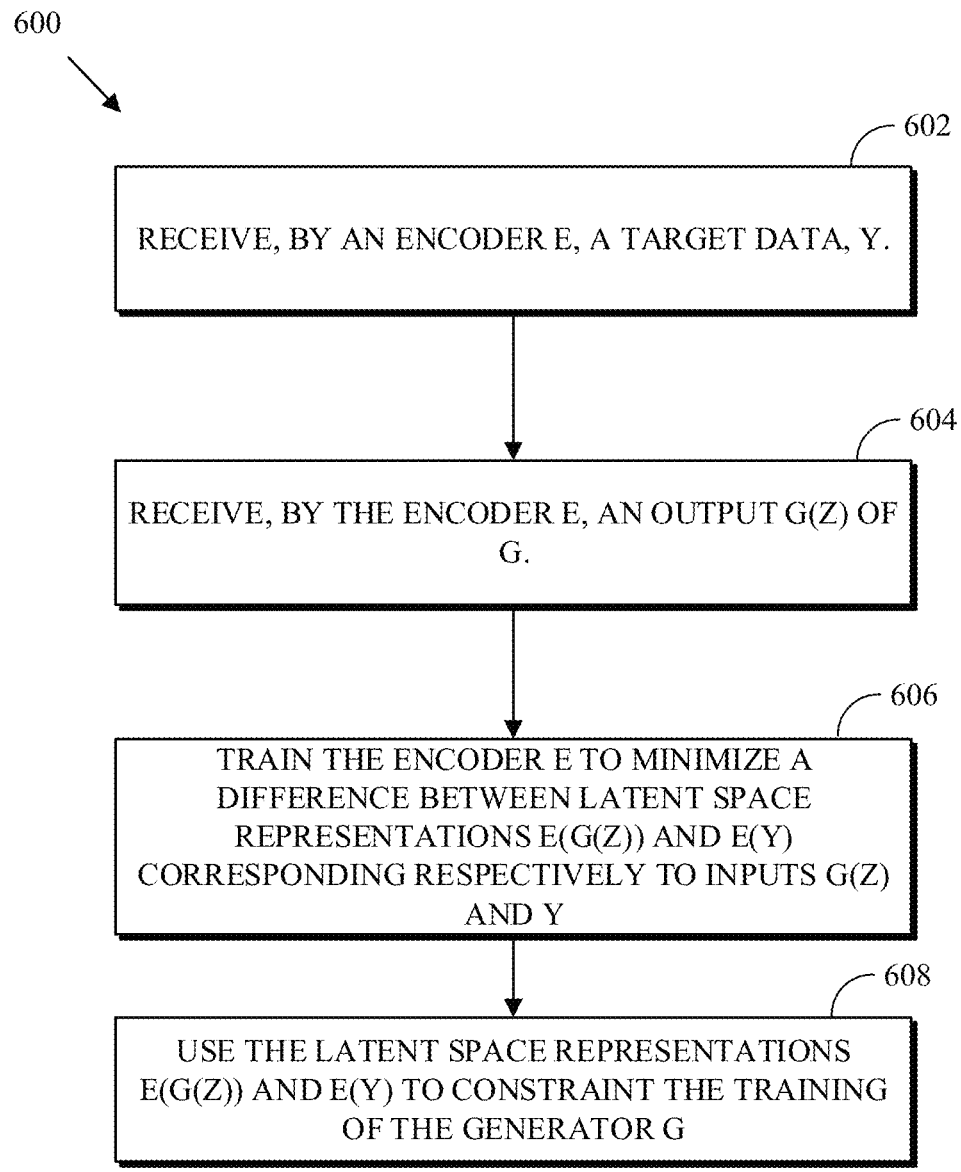
FIG. 6 is an example of a flowchart of a technique of training a Generative Adversarial Network (GAN) according to implementations of this disclosure.

FIG. 6 is an example of a flowchart of a technique 600 of training a Generative Adversarial Network (GAN) according to implementations of this disclosure. The GAN can be the GAN 500 of FIG. 5. As such, the generator G can be the generator 502 of FIG. 5; and the GAN can include a discriminator D, such as the discriminator 504 of FIG. 5 and an encoder E, such as the encoder 506 of FIG. 5. The technique 600 can be implemented by a computing device (i.e., an apparatus), such as the computing device 200 of FIG. 2. Upon completion of the technique 600, the parameters of the generator G may be stored. The parameters can be stored in a memory, such in the memory 204 of FIG. 2. The parameters of the generator G can include the networks weights of the generator G. The parameters can also include the generator network architecture, such as the number of layers, the configuration of each layer, and the like.

The technique 600 can be performed partially or fully by one or more processors, such as the CPU 202 of FIG. 2. The technique 600 can be stored as executable instructions in one or more memories, such as the memory 204 or the secondary storage 214 of FIG. 2. The one or more processors can be configured to execute the instructions stored in the one or more memories.

In an example, the generator G, the encoder E, and the discriminator D can be available on (e.g., executing on) one or more computing devices, such as the computing device 200 of FIG. 2. In an example, each of the generator G, the encoder E, and the discriminator D can be available on a separate computing device. However, that need not be the case.

At 602, the encoder E can receive a target data, Y. The target data Y can be a real data sample. For example, the target data Y can be a real image. The encoder E can generate a first latent space representation, E(Y), of Y, as described above.

At 604, the encoder E can receive an output G(Z) of G. As described above, G(Z) is synthetic data that are generated by the generator G given a noisy sample Z having a data-generating distribution $p_g(z)$. As mentioned above, the target data Y corresponds to the output G(Z). The encoder E can generate a second latent space representation, E(G(Z)), of G(Z), as described above. As also described above, the discriminator D is trained to distinguish which of the G(Z) and the target data Y is generated and/or real data.

At 606, the technique 600 trains the encoder E to minimize a difference between a first latent space representation (i.e., first latent space features) E(G(Z)) of the output G(Z) and a second latent space representation (i.e., second latent space features) E(Y) of the target data Y, where the output G(Z) and the target data Y are input to the encoder E.

At 608, the technique 600 uses the latent space representations E(G(Z)) and E(Y) to constrain the training of the generator G, as described above.

As described above with respect to Table I, the technique 600 can include updating the encoder E by descending, for m samples, a gradient $$\nabla_{\theta_E} \frac{1}{m} \Sigma_{i=1}^m |E_{\theta_E}(y_i) - E_{\theta_E}(G_{\theta_G}(z_i))|.$$

As described above, using the latent spaces E(G(Z)) and E(Y) to constrain the training of the generator G can include updating the generator G by descending, for m samples, a gradient $$\nabla_{\theta_G} \frac{1}{m} \sum_{i=1}^m [\log(1 - D_{\theta_D}(G_{\theta_G}(z_i))) + \mu_1 * |y_i - G_{\theta_G}(z_i)| - \mu_2 * |E_{\theta_E}(y_i) - E_{\theta_E}(G_{\theta_G}(z_i))|].$$

Parameters $\mu_1$ and $\mu_2$ are hyperparameters, as described above.

when the training is completed, the discriminator D is no longer able to distinguish a real data sample (a real image) from a generated (e.g., synthetic, generated) sample. If the discriminator is still able to distinguish real from fake, it means that the training is not optimized and the training cannot be considered completed. As already mentioned, the principle of the GAN model is that the generator tries to confuse the discriminator; and the discriminator tries to not be confused. Thus, the process is "adversarial." However, eventually, when the generator G does a good enough job of data generation, the discriminator D will no longer be able to tell which of the first input data (e.g., a first image) and the second input data (e.g., a second image) is real or fake.

In an example, the encoder E can be or can include a VGG network. In an example, the VGG network can be adapted or can include one or more upscaling layers. The purpose of the one or more upscaling layers is so that the output of the encoder E can have the same dimensionality as the random sample Z. More generally, the encoder E can be, or can include, other neural network types, such as a convolutional neural network. In other examples, the encoder E can be, or can implement, other machine learning models or techniques.

As described above, the generator G can be trained by applying a Lipschitz condition so as to upper bound a first difference between the output G(Z) and the target data Y to a second difference between the first latent space representation E(G(Z)) and the second latent space representation E(Y).

It is also to be noted that, typically, when the GAN network is trained, it is the generator that is subsequently used to generate data and/or to perform inferences or any other task for which the generator is trained. Typically, the encoder and the discriminator are not used for purposes other than in the training of the generator.

As mentioned, the techniques described herein can be used in supervised training. Supervised training may be used for applications such as image super resolution and inpainting.

For example, in the case of image super resolution, the input sample Z to the generator, during training, can be, or can be thought of, as a low resolution image and the output G(Z) can be or can be thought of as a corresponding high resolution image. As such, the input sample Z can have the same size as that of a low resolution image. In another example, the input sample Z can correspond to a feature vector of features extracted from a low resolution image.

Another aspect of the disclosed implementations is a method for generating a super resolution image. The method can include receiving, by a generator G, an input corresponding to a low resolution image and outputting, from the generator G, a super resolution image corresponding to the low resolution image. In an example, the input can be the low resolution image itself. In another example, the input can be a vector of features extracted from the low resolution image.

The generator can be trained using a Generative Adversarial Network (GAN) as described above. As such, the GAN can include the generator G, an encoder E, and a discriminator D. As described above, the outputs of the encoder E can be used to constrain the training of the generator G. The outputs of the encoder can include a first latent space representation E(G(Z)) of an output G(Z) of the generator G, where Z corresponds to a training low-resolution image and G(Z) corresponds to a generated high-resolution image; and a second latent space representation E(Y) of a training high-resolution image Y. The encoder can be trained to minimize a difference between the first latent space representation E(G(Z)) and the second latent space representation E(Y). The encoder can be trained by descending, for m samples, a gradient $$\nabla_{\theta_E} \frac{1}{m} \Sigma_{i=1}^m |E_{\theta_E}(y_i) - E_{\theta_E}(G_{\theta_G}(z_i))|,$$

as described above. The generator G can be trained by applying a Lipschitz condition so as to upper bound a first difference between the generated high-resolution image and the training high-resolution image Y to a second difference between by the first latent space representation E(G(Z)) and the second latent space representation E(Y). In an implementation, as also mentioned above, the encoder E can be, or can include, a VGG network. However, other neural networks, such as a convolutional neural networks, or other machine learning models are possible.

In SISR applications, for every Z (i.e., a low resolution image) that is input to the generator G, there is a desired target Y (i.e., a real high resolution image) for G(Z) (i.e., a generated high resolution image) and G(z) is expected to be close to Y. Minimizing the difference between the generated high resolution image G(Z) and the target high resolution image Y can be added as a constraint to the loss function of the generator (i.e., the constraint can be added to equation (2)). By adding the constraint to equation (2), equation (11) is obtained.

$$\theta_G^* = \arg_{\theta_G} \min_{\theta_G} EP_z[\log(1-D_{\theta_D}(G_{\theta_G}(z))+ \lambda^*|y-G_{\theta_G}(z)|] \quad (11)$$

In equation (11), λ is a constant and $\theta_G$ is the current set of weights of the generator network; $G_{\theta_G}(z)$ is the high resolution image generated by the generator given the input the low resolution image z and the current set of generator network weights $\theta_G$; $\theta_D$ is the current set of weights of the discriminator network; and EP represents the expectation with respect to the distribution of the noisy input sample Z. $\theta_G^*$ is the new set of weights of the generator network resulting from the optimization problem of equation (11).

However, as mentioned above, optimizing the loss function of equation (11) can generate soft (e.g., blurred) images that lack details and sharpness. Proper measures are desired to reflect human visual perceptual quality of images that are generated by a generator, such as the generator 102 of FIG. 1 or the generator 502 of FIG. 5. As mentioned, existing perceptual loss metrics can be mostly based on the difference of the values in certain pre-trained CNN feature space. While this helps improve perceptual quality of the generated images, important internal image structures can still be distorted or missing.

In an example, the pre-trained CNN can be one of the many CNN models. The pre-trained CNN can be a VGG19. VGG19 is a 19-layer VGG network that is pre-trained on images from the ImageNet database. The VGG19, when presented with an input image, outputs feature maps of the input image. VGG, named after the Visual Geometry Group at Oxford University, as mentioned above.

G(Z) (i.e., the generated high resolution image) and Y (i.e., the target high resolution image) can be fed to the pre-trained VGG19 network. Features output from certain layer or layers of the CNN are referred to herein as contextual data for the purposes of calculating the perceptual loss as further described below.

The generated contextual data is a set $\{g_1, \ldots, g_N\}$ of features of the CNN when G(Z) is input to the CNN. The real contextual data is a set $\{x_1, \ldots, x_N\}$ of features of the CNN when Y is input to the CNN. Each of the features $g_i$ and $x_i$, for i=1, ..., N is a point in the feature maps.

The contextual data can include the feature maps that are output from one or more of the layers of the CNN (e.g., the VGG19 network). For example, the contextual data can include the outputs of a $k^{th}$ convolutional layer of the CNN (e.g., VGG19) network. In an example, the $k^{th}$ can be the third, fourth, or some other layer number, or a combination thereof. In an example, the feature maps that are output from a $k^{th}$ convolutional layer can be processed by a following pooling layer before being used as contextual data. In an example, the feature maps that are output from a $k^{th}$ convolutional layer can be processed by a following non-linear activation layer before being used as contextual data. As such, the contextual data can include feature maps that are output by one or more convolutional layers, zero or more pooling layers, zero or more non-linear activation layers, zero or more other layer types of the CNN, or a combination thereof.

To reiterate, the contextual data $\{g_1, \ldots, g_N\}$ corresponding to a generated high resolution image G(Z), is referred to herein as generated contextual data; and the contextual data $\{x_1, \ldots, x_N\}$ corresponding to a real (e.g., target) high resolution image Y, is referred to herein as real contextual data.

As further described below, a perceptual loss that is calculated using the generated contextual data $\{g_1, \ldots, g_N\}$ and the real contextual data $\{x_1, \ldots, x_N\}$ can be used in the training of the generator of a GAN. The perceptual loss between a real high resolution image Y and a generated high resolution image G(Z) is denoted $L_{pcept}$ (G(Z),Y). The equation (11) can be modified to incorporate the perceptual loss, as shown in equation (12).

$$\theta_G^* = \arg_{\theta_G} \min_{\theta_G} EP_z \begin{bmatrix} \log(1 - D_{\theta_D}(G_{\theta_G}(z))) + \\ \lambda*|y - G_{\theta_G}(z)| + \mu*L_{pcept}(G_{\theta_G}(Z), Y) \end{bmatrix} \quad (12)$$

Figure 7:
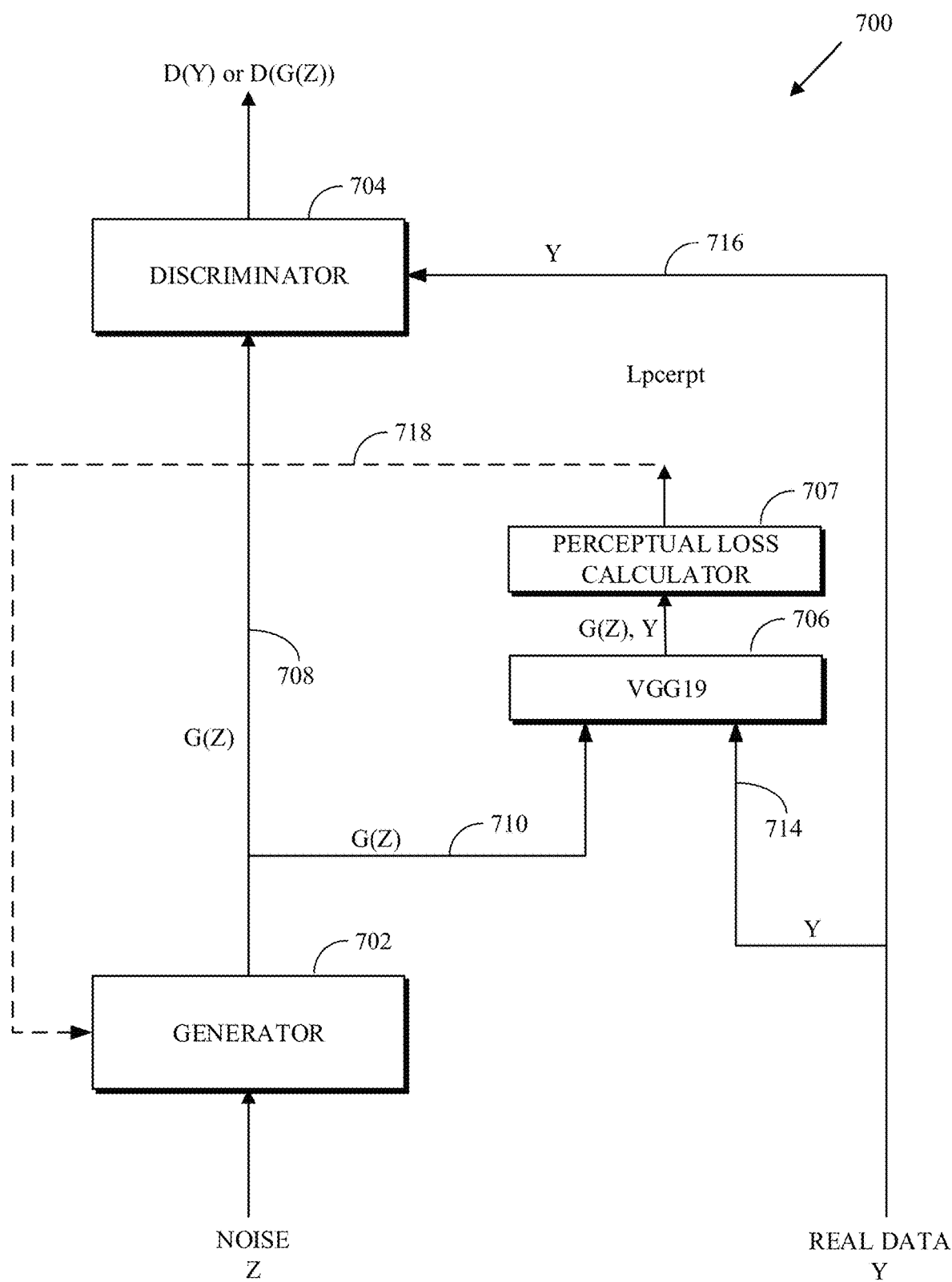
FIG. 7 is an example of a GAN architecture for super resolution according to implementations of this disclosure.

FIG. 7 is an example of a GAN architecture 700 for super resolution according implementations of this disclosure. The GAN architecture 700 includes a generator 702, a discriminator 704, a CNN 706, and a perceptual loss calculator 707. The generator 702 can be as described with respect to the generator 102 of FIG. 1, with the exception that the objective function of the generator 702 is different from that of the generator 102 as described herein. The discriminator 704 can be as described with respect to the discriminator 104 of FIG. 1. The CNN 706 can be a neural network, such as a convolutional neural network. In an example, the CNN 706 can be, as described above, a pre-trained VGG19 network. The CNN 706 can be implemented by or executed by a computing device, such as the computing device 200 of FIG. 2. The perceptual loss calculator 707 calculates the perceptual loss $L_{pcept}$, as further described below.

As described above with respect to the generator 102 of FIG. 1, the generator 702 can receive as input an input Z and output a generated sample G(Z). The input Z can be a noisy sample that is sampled from a distribution, p(z). For example, the input Z is usually a low resolution image that can be contaminated by random noise or other impairments. Via training, the generator learns to generate (e.g., output) a high resolution image G(Z) from a low resolution image Z, that is close to the expected high resolution image Y.

The discriminator 704 can receive either the generated sample G(Z) (i.e., a generated high resolution image) along a path 708 or receive, along a path 716, a target Y (i.e., a real high resolution image) corresponding to G(Z). When the discriminator 704 receives G(Z), the discriminator 704 outputs a value D(G(Z)) indicating whether the discriminator 704 determined the G(z) to be real or generated. When the discriminator 704 receives Y, the discriminator 704 outputs a value D(Y) indicating whether the discriminator 704 determined the input Y to be real or generated.

The CNN 706 also receives as input the target Y, along a path 714, and the generated sample, G(Z), along a path 710. When the CNN 706 receives G(Z), the CNN 706 outputs a set of generated contextual data, the set $\{g_1, \ldots, g_N\}$. When the CNN 706 receive Y, the CNN 706 outputs a set of real contextual data, the set $\{x_1, \ldots, x_N\}$.

As mentioned above, the perceptual loss calculator 707 uses the generated contextual data, $\{g_1, \ldots, g_N\}$, and the real contextual data, $\{x_1, \ldots, x_N\}$, to calculate a perceptual loss. The calculated perceptual loss can be used to optimize the generator 702, as illustrated by a dashed line 718. The generator 702 is optimized by incorporating the perceptual loss into the objective function of the generator 702 as described with respect to equation (12).

The perceptual loss calculator 707 can calculate the perceptual loss using several techniques.

In an example, structure similarities can first be calculated. The structure similarities are calculated based on the feature maps (i.e., the contextual data). The structure similarities can be based on cosine similarity between the generated and real feature maps. As is known, cosine similarity is a measure of similarity between two non-zero vectors of an inner product space that measures the cosine of the angle between the two non-zero vectors. A structure similarity can be calculated for each combination generated context datum $g_i$, for $i=1, \ldots, N$, and a real context datum $x_j$, for $j=1, \ldots, N$. A structure similarity, $c_{ij}$, between a generated contextual datum $g_i$ and a real contextual datum $x_j$, can be calculated as given by equation (13):

$$c_{ij} = \begin{cases} \frac{(g_i - \bar{g})(x_j - \bar{x})}{\|g_i - \bar{g}\|_2 \|x_j - \bar{x}\|_2}, & \text{when } (g_i - \bar{g}) \neq 0 \text{ and } (x_j - \bar{x}) \neq 0 \\ 0, & \text{otherwise} \end{cases} \quad (13)$$

In equation (13), $\bar{g}$ is the average of the generated contextual data $\{g_1, \ldots, g_N\}$ and $\bar{x}$ is the average of the real contextual data $\{x_1, \ldots, x_N\}$. The numerator $(g_i - \bar{g})(x_j - \bar{x})$ is the cross product of $(g_i - \bar{g})$ and $(x_j - \bar{x})$. A structure similarity value $c_{ij}$ is the inner product of the two vectors (i.e., the numerator of equation (13)) that is then normalized by the norm (i.e., the denominator of equation (14)).

The $c_{ij}$ values range from $-1$ to $1$. A value of 0 indicates that the two vectors are perpendicular to each other. A value of 1 indicates that the two vectors are parallel to each other and, therefore, the two vectors are most similar. A value of $-1$ indicates that the two vectors are exactly opposite.

Alternatively, instead of the averages $\bar{g}$ and $\bar{x}$, a structure similarity $c_{ij}$ can be calculated based on a single reference point, r, as shown in equation (14).

$$c_{ij} = \begin{cases} \frac{(g_i - r)(x_j - r)}{\|g_i - r\|_2 \|x_i - r\|_2}, & \text{when } (g_i - r) \neq 0 \text{ and } (x_j - r) \neq 0 \\ 0, & \text{otherwise} \end{cases} \quad (14)$$

The reference point r can be one of the generated contextual data (i.e., r can be one of $g_i$ of $\{g_1, \ldots, g_N\}$), one of the real contextual data (i.e., r can be one of $x_i$ of $\{x_1, \ldots, x_N\}$), a combination of one or more $g_i$'s and one or more $x_j$'s, or some other reference point.

A structure distance, $d_{ij}$, between a generated contextual datum $g_i$ and a real contextual datum $x_j$ can then be computed for each of the calculated structure similarity values as shown in equation (15).

$$d_{ij} = (1 - c_{ij})/2 \quad (15)$$

Whereas structure similarity $c_{ij}$ is a measure of the similarity between a $g_i$ and an $x_j$, the structural distance $d_{ij}$ is a measure of dissimilarity between the $g_i$ and the $x_j$. The perceptual loss between the generated high resolution image G(Z) and real high resolution Y can now be calculated using the calculated structural distances. In one example, the perceptual loss can be calculated as shown in equation (16). In another example, the perceptual loss can be calculated as shown in equation (17).

$$L_{pcept}(G(Z), Y) = \left(\frac{1}{N} \sum_j \max_i d_{ij}\right) \quad (16)$$

$$L_{pcept}(G(Z), Y) = -\log\left(\frac{1}{N} \sum_j \max_i d_{ij}\right) \quad (17)$$

With respect to equation (16), for each j (e.g., for each $\{g_1, \ldots, g_N\}$), the maximum structural distance of that $g_j$ and all of the $\{x_1, \ldots, x_N\}$ are selected and summed. Equivalently, for each j (e.g., for each $\{x_1, \ldots, x_N\}$), the maximum structural distance of that $x_j$ and all of the $\{g_1, \ldots, g_N\}$ are selected and summed. It is noted that a $\max_i d_{ij}$ corresponds to a maximum structural distance. A $c_{ij}=0$ (i.e., perpendicular vectors) results in $d_{ij}=\frac{1}{2}$; a $c_{ij}=1$ (i.e., greatest similarity) results in $d_{ij}=0$; and a $c_{ij}=-1$ (i.e., greatest dissimilarity) results in $d_{ij}=1$. As such, the greater (smaller) the structural similarity between two feature maps, the smaller (greater) the structural distance between them.

In another example, the structure distances $d_{ij}$'s can be normalized into corresponding $n_{ij}$'s, as shown in equation (18). The normalized structural distances are then used to calculate the perceptual loss using one of the equations (19) or (20).

$$\begin{cases} d'_{ij} = \frac{d_{ij}}{\min_k d_{ik} + \varepsilon}, & \text{where } \varepsilon \text{ is a small positive number} \\ n_{ij} = \frac{\exp(1 - d'_{ij}/b)}{\Sigma_k \exp(1 - d'_{ik}/b)}, & \text{where } b \text{ is a positive parameter} \end{cases} \quad (18)$$

$$L_{pcept}(G(z), y) = \left(\frac{1}{N} \sum_j \max_i n_{ij}\right) \quad (19)$$

$$L_{pcept}(G(z), y) = -\log\left(\frac{1}{N} \sum_j \max_i n_{ij}\right). \quad (20)$$

In an example, $\varepsilon$ of equation (18) can be $1e^{-6}$, and the variable b is referred as the bandwidth parameter, which is used as a smoothing parameter and can be determined empirically. The equation (18) can be used to normalize the structure distance values so that their sum adds up to 1. More specifically, the sum of the $n_{ij}$ values over any j is equal to 1. That is, $\Sigma_j n_{ij}=1$. The $n_{ij}$ values can be normalized so that they can be similar to probability values. That is, the range of the $n_{ij}$ values is [0, 1].

While perceptual loss is described with respect the loss function of equations (1) and (2), the disclosure herein is not so limited. The perceptual loss described herein can be incorporated into (e.g., used in conjunction with) other forms of the discriminator function and the generator adversarial function.

Table II illustrates an example pseudocode of a training algorithm of GANs using perceptual loss as described herein, such as the GAN 700 of FIG. 7.

TABLE II

0 Network weight parameters $\theta_D$ and $\theta_G$ are first randomly initialized.
1 For N training iterations do
2   For L steps do
3     Sample mini-batch of m noisy data samples $\{z_1, \ldots, z_m\}$ from noisy data prior $p_g(z)$. The corresponding m target samples are $\{y_1, \ldots, y_m\}$.
4     Update the discriminator D by ascending its stochastic gradient:

$$\nabla_{\theta_D} \frac{1}{m} \sum_{i=1}^{m} [\log(D_{\theta_D}(y_i)) + \log(1 - D_{\theta_D}(G_{\theta_G}(z_i)))]$$

5   End for
6   Sample mini-batch of m noisy data samples $\{z_1, \ldots, z_m\}$ from noisy data prior $p_g(z)$. The corresponding m target samples are $\{y_1, \ldots, y_m\}$.
7   Update the generator G by descending its stochastic gradient:

$$\nabla_{\theta_G} \frac{1}{m} \sum_{i=1}^{m} \begin{bmatrix} \log(1 - D_{\theta_D}(G_{\theta_G}(z_i))) + \\ \lambda * |y_i - G_{\theta_G}(z_i)| + \mu * L_{pcept}(G(z_i), y_i) \end{bmatrix}$$

8 End For

Table II illustrates that the GAN model can be trained in N iterations. Each of the discriminator network (i.e., the discriminator 704 of FIG. 7) and the generator network (i.e., the generator 702 of FIG. 7) are trained in one iteration. That is, one iteration involves the training of the two networks: the discriminator and the generator. As an initialization step (i.e., row 0 of Table II), the weights $\theta_D$ and $\theta_G$ of, respectively, the discriminator and the generator networks are initialized to random values.

A first Loop of L steps (consisting of rows 2-5 in Table II) describes the training of the discriminator network. In some implementations, L is 1. In other implementations, L can be larger than 1. As such, the discriminator network can be optimized 1 or more times, depending on the value of L.

In each iteration, at row 3 of Table II, a mini-batch of m noisy sample $\{z_1, \ldots, z_m\}$, can be selected using the noisy data-generating distribution $p_g(z)$. For example, the mini-batch $\{z_1, \ldots, z_m\}$ is a batch of low resolution images in image super resolution. As supervised learning is described herein, there are corresponding m target samples, corresponding to each of the input samples. That is, for the input $z_i$ there is a desired output of $y_i$ (i.e., a target high resolution image). Next, at row 4 of Table II, the discriminator weights, $\theta_D$, are updated by the gradient ascent (since, as shown in equation (1), updating the discriminator weights is a maximization optimization problem). The details of gradient ascent (and descent) are not described herein as their details are known to a person skilled in the art and an understanding thereof is not necessary to the understanding of this disclosure.

After the L steps of training the discriminator, the algorithm of Table II proceeds to update the generator network. At row 6 of Table II, another mini-batch (i.e., a set) of noisy samples $\{z_1, \ldots, z_m\}$ that are sampled using the noisy data-generating distribution $p_g(z)$, and the corresponding desired targets $\{y_1, \ldots, y_m\}$ are selected. Again, as supervised learning is described herein, each $z_i$ corresponds to a $y_i$.

At row 7 of Table II, the generator parameters, $\theta_G$, are updated using by the right hand side of equation (12). That is, the updated parameters can be obtained by descending the stochastic gradient of the right hand side of equation (12).

The above described process completes one iteration of updating the respective parameters of the for discriminator and the generator networks. The process can be repeated N times, where N can be a sufficiently large enough number so that the GAN network converges. N can also be set empirically. In an example, the algorithm may not execute N times; rather the algorithm may include a termination condition that terminates the algorithm when it is determined that performance of the GAN network is no longer improving sufficiently. In an example, the discriminator can be trained after the generator. As such, the rows 2-5 can be after the rows 6-7 in Table II.

Figure 8:
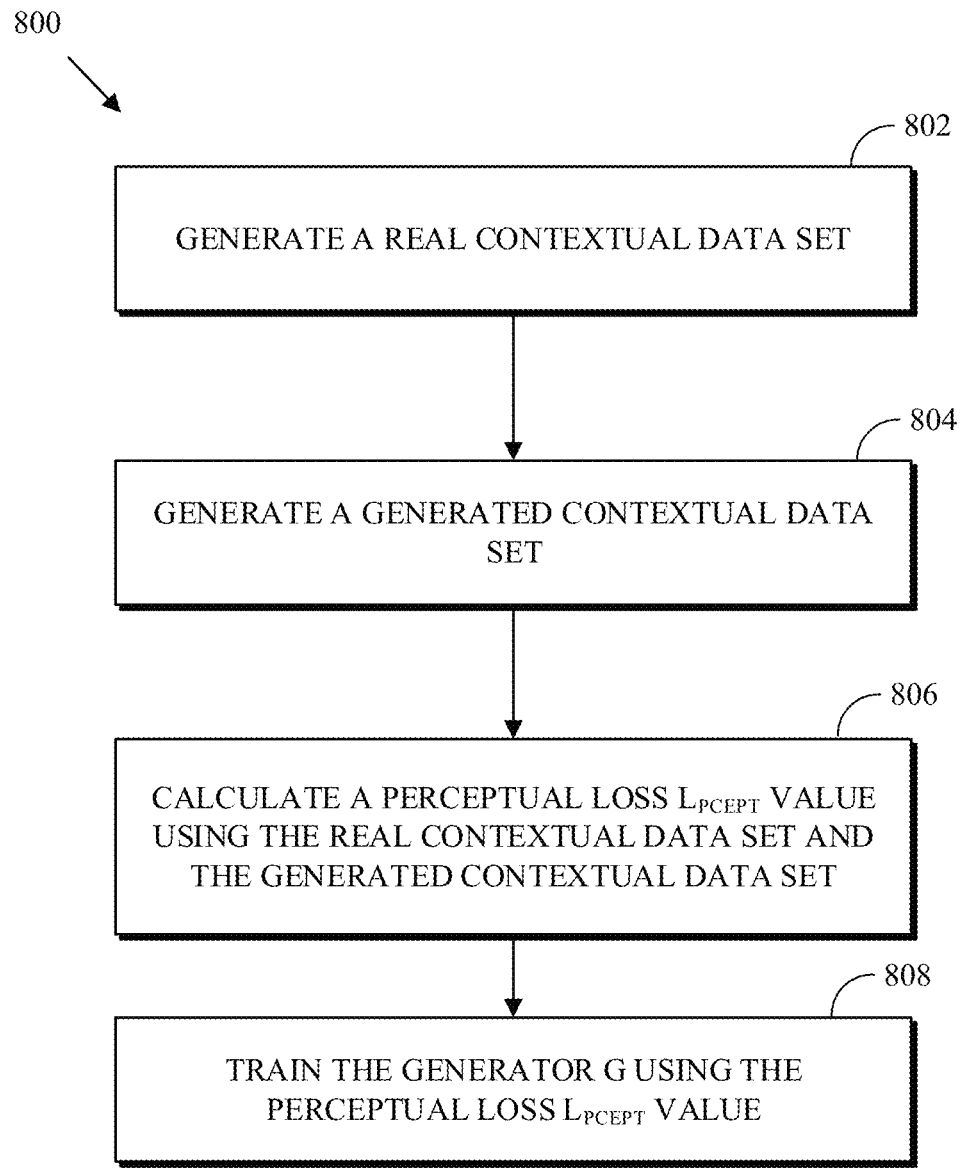
FIG. 8 is an example of a flowchart of a technique of training a Generative Adversarial Network (GAN) using perceptual loss according to implementations of this disclosure.

FIG. 8 is an example of a flowchart of a technique 800 of training a Generative Adversarial Network (GAN) using perceptual loss according to implementations of this disclosure. The GAN can be the GAN 700 of FIG. 7. As such, the generator G can be the generator 702 of FIG. 7. The GAN can include a discriminator D, such as the discriminator 704 of FIG. 7, a feature extraction CNN, such as the CNN 706 of FIG. 7, and a perceptual loss calculator, such as the perceptual loss calculator 707 of FIG. 7. The technique 800 can be implemented by a computing device (e.g., an apparatus), such as the computing device 200 of FIG. 2. Upon completion of the technique 800, the parameters of the generator G may be stored. The parameters can be stored in a memory, such as in the memory 204 of FIG. 2. The parameters of the generator G can include the networks weights of the generator G. The parameters can also include the generator network architecture, such as the number of layers, the configuration of each layer, the hyper parameters, and the like.

The technique 800 can be performed partially or fully by one or more processors, such as the CPU 202 of FIG. 2. The technique 800 can be stored as executable instructions in one or more memories, such as the memory 204 or the secondary storage 214 of FIG. 2. The one or more processors can be configured to execute the instructions stored in the one or more memories.

In an example, the generator G, the encoder E, the discriminator D, and the feature extraction CNN can be available on (e.g., executing on) one or more computing devices, such as the computing device 200 of FIG. 2. In an example, each of the generator G, the encoder E, the discriminator D, and the feature extraction CNN can be available on a separate computing device. However, that need not be the case.

At 802, the technique 800 generates a real contextual data set $\{x_1, \ldots, x_N\}$ for a high resolution image Y, as described with respect to the CNN 706 of FIG. 7. At 804, the technique 800 generates a generated contextual data set $\{g_1, \ldots, g_N\}$ for a generated high resolution image G(Z), as described with respect to the CNN 706 of FIG. 7. As described with respect to FIG. 7, G(Z) is a generated high resolution image that is generated by a generator of the GAN, such as the generator 702. G(Z) is generated in response to the generator receiving a low resolution image Z as input.

At 806, the technique 800 calculates a perceptual loss $L_{pcept}$ value using the real contextual data set $\{x_1, \ldots, x_N\}$ and the generated contextual data set $\{g_1, \ldots, g_N\}$. In an example, the real contextual data set $\{x_1, \ldots, x_N\}$ and the generated contextual data set $\{g_1, \ldots, g_N\}$ can be generated using a VGG19 network, as described above. In an example, calculating the perceptual loss can include calculating structure similarities between each $x_i$ and $g_j$; calculating respective structure distances for the structure similarities; and calculating the perceptual loss using the structure similarities. In an example, the structure similarities can be calculated using equation (13). In another example, the structure similarities can be calculated using equation (14). In an example, the structure distances can be calculated using equation (15). In an example, the perceptual loss can be calculated using equation (16). In an example, the perceptual loss can be calculated using equation (17). In an example, and as described with respect to equation (18), the structure distances can be normalized before being used to calculate the perceptual loss. As such, one of the equations (19) or (20) can be used to calculate the perceptual loss.

As such, calculating the structure similarities between each $x_i$ and $g_j$ can include calculating a cosine similarity between an $x_i$ and a $g_j$ using a reference point. In an example, the reference point can include at least one of a first average g of the generated contextual data set $\{g_1, \ldots, g_N\}$ or a second average x of the real contextual data set $\{x_1, \ldots, x_N\}$. In an example, the reference point can include both the first average g of the generated contextual data set $\{g_1, \ldots, g_N\}$ and the second average x of the real contextual data set $\{x_1, \ldots, x_N\}$. In an example, the reference point can be a generated contextual data element of the generated contextual data set $\{g_1, \ldots, g_N\}$. In an example, the reference point can be a real contextual data element of the real contextual data set $\{x_1, \ldots, x_N\}$. In an example, the reference point can be a combination of the generated contextual data element and the real contextual data element.

In an example, calculating the respective structure distance for each of the structure similarities can include calculating a structure distance $d_{ij}$ for a structure similarity $c_{ij}$ between an $x_i$ and a $g_j$ using $d_{ij}=(1-c_{ij})/2$. In an example, calculating the perceptual loss using the structure distances can include determining, for each $g_i$ of the generated contextual data set $\{g_1, \ldots, g_N\}$, a respective maximum structure distance from among structure distances $d_{ij}$ between $g_i$ and each $x_j$ of the real contextual data set $\{x_1, \ldots, x_N\}$; and calculating the perceptual loss using the respective maximum structure distances.

In an example, training the generator G using the perceptual loss $L_{pcept}$ value can include updating the generator G by descending, for m sample pairs, a gradient $$\nabla_{\theta_G} \frac{1}{m} \sum_{i=1}^{m} [\log(1 - D_{\theta_D}(G_{\theta_G}(z_i))) + \mu_1 * |y_i - G_{\theta_G}(z_i)| + \mu * L_{pcept}(G_{\theta_G}(z_i), y_i)].$$

Figure 9:
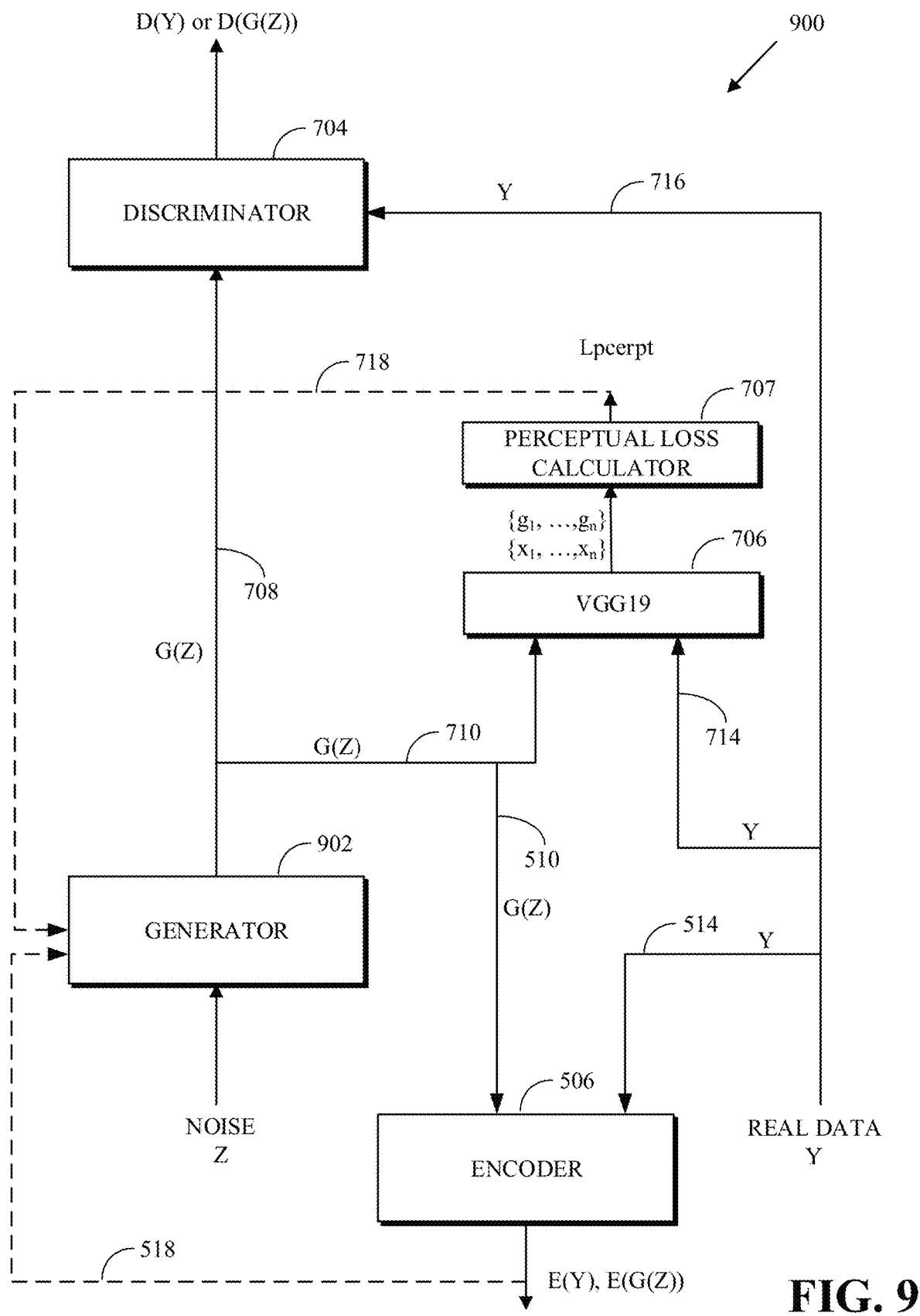
FIG. 9 is an example of a GAN according to implementations of this disclosure.

A GAN according to this disclosure can combine an encoder, such as described with respect to FIG. 5, and perceptual loss calculation, such as described with respect to FIG. 7. FIG. 9 is an example of a GAN 900 according to implementations of this disclosure. The GAN 900 includes elements having numerals of the form 5xx (where "xx" represents any two digits), which are as described with respect to FIG. 5, and elements having numerals of the form 7xx, which are as described with respect to FIG. 7. The GAN 900 includes a generator 902. The generator 902 can be as described with respect to the generator 502 of FIG. 5 or the generator 702 of FIG. 7 with the exception that generator 902 is trained using both the encoder 506 output and the perceptual loss calculated by the perceptual loss calculator 707. As such, the generator 902 can be updated by descending its stochastic gradient that combines the equations (9) and (12). As such, the stochastic gradient of the generator 902 can be $$\nabla_{\theta_G} \frac{1}{m} \Sigma_{i=1}^{m} [\log(1 - D_{\theta_D}(G_{\theta_G}(z_i))) + \mu_1 * |y_i - G_{\theta_G}(z_i)| - \mu_{2*} |E_{\theta_E}(y_i) - E_{\theta_E}(G_{\theta_G}(z_i))| + \mu * L_{pcept}(G_{\theta_G}(z_i), y_i)].$$

Accordingly, and returning to FIG. 9, in an example, the technique 900 can include receiving, by an encoder E, the high resolution image Y; receiving, by the encoder E, a generated high resolution image G(Z), such that a discriminator, D, of the GAN is trained to distinguish which of the G(Z) and Y is generated data; training the encoder E to minimize a difference between latent space representations E(G(Z)) and E(Y) corresponding respectively to inputs G(Z) and Y to the encoder E; and using the latent space representations E(G(Z)) and E(Y) to constrain the training of the generator G.

Table III illustrates an example pseudocode of a training algorithm of GANs using perceptual loss as described herein, such as the GAN 900 of FIG. 9.

TABLE III

0 Network weight parameters $\theta_D$, $\theta_E$, and $\theta_G$ are first randomly initialized.
1 For N training iterations do
2    For L steps do
3       Sample mini-batch of m noisy data samples $\{z_1, \ldots, z_m\}$ from noisy data prior $p_g(z)$. The corresponding m target samples are $\{y_1, \ldots, y_m\}$.
4       Update the discriminator D by ascending its stochastic gradient:

$$\nabla_{\theta_D} \frac{1}{m} \sum_{i=1}^{m} [\log(D_{\theta_D}(y_i)) + \log(1 - D_{\theta_D}(G_{\theta_G}(z_i)))]$$

5    End for
6    Sample mini-batch of m noisy data samples $\{z_1, \ldots, z_m\}$ from noisy data prior $p_g(z)$. The corresponding m target samples are $\{y_1, \ldots, y_m\}$.
7    Update the generator G by descending its stochastic gradient:

$$\nabla_{\theta_G} \frac{1}{m} \sum_{i=1}^{m} \begin{bmatrix} \log(1 - D_{\theta_D}(G_{\theta_G}(z_i))) + \\ \mu_1 * |y_i - G_{\theta_G}(z_i)| - \mu_2 * |E_{\theta_E}(y_i) - E_{\theta_E}(G_{\theta_G}(z_i))| + \\ \mu * L_{pcept}(G_{\theta_G}(z_i), y_i) \end{bmatrix}$$

8    Update the encoder E by descending its stochastic gradient:

$$\nabla_{\theta_E} \frac{1}{m} \sum_{i=1}^{m} |E_{\theta_E}(y_i) - E_{\theta_E}(G_{\theta_G}(z_i))|$$

9 End For

The pseudocode of Table III differs from the pseudocode of Table I in that the pseudocode of Table I uses a different loss function for the generator G, as shown in row 7 of Table III as compared to the row 7 of Table I.

In an example, the technique 900 can further include updating the encoder E by descending, for m sample pairs, a gradient $$\nabla_{\theta_E} \frac{1}{m} \Sigma_{i=1}^{m} |E_{\theta_E}(y_i) - E_{\theta_E}(G_{\theta_G}(z_i))|,$$

where $E_{\theta_E}(y_i)$ is a first output of the encoder E given first current weight value $\theta_E$ of the encoder E and a first input $y_i$, where $G_{\theta_G}(z_i)$ is a second output of the of the generator G given second current weight value $\theta_G$ of the generator G and a second input $z_i$, and where $E_{\theta_E}(G_{\theta_G}(z_i))$ is a third output of the of the encoder E given the first current weight value $\theta_E$ of the encoder E and $G_{\theta_G}(z_i)$ as input.

In an example, using the latent spaces E(G(Z)) and E(Y) to constrain the training of the generator G can include updating the generator G by descending, for m sample pairs, a gradient $$\nabla_{\theta_G} \frac{1}{m} \sum_{i=1}^{m} [\log(1 - D_{\theta_D}(G_{\theta_G}(z_i))) + \mu_1 * |y_i - G_{\theta_G}(z_i)| - \mu_2 * |E_{\theta_E}(y_i) - E_{\theta_E}(G_{\theta_G}(z_i))| + \mu * L_{pcept}(G_{\theta_G}(z_i), y_i)].$$

As mentioned above, the techniques described herein can be used for generating a high resolution image from a single image. For example, in the case of single image super resolution, the input sample Z to the generator, during training, can be, or can be thought of, as the low resolution image and the output G(Z) can be or can be thought of as a corresponding high resolution image. As such, the input sample Z can have the same size as that of a low resolution image. In another example, the input sample Z can correspond to a feature vector of features extracted from a low resolution image.

Another aspect of this disclosed implementations is a method of generating a super resolution image. The method can include receiving, by a generator G, an input corresponding to a low resolution image; and outputting, from the generator G, a super resolution image corresponding to the low resolution image. As described above, the generator G can be trained by steps that include generating a real contextual data set $\{x_1, \ldots, x_N\}$ for a target high resolution image Y; generating a generated contextual data set $\{g_1, \ldots, g_N\}$ for a generated high resolution image G(Z), where the generated high resolution image G(Z) is generated by the generator G of the GAN in response to receiving an input Z that corresponds to the target high resolution image Y; calculating a perceptual loss $L_{pcept}$ value using the real contextual data set $\{x_1, \ldots, x_N\}$ and the generated contextual data set $\{g_1, \ldots, g_N\}$; and training the generator G using the perceptual loss $L_{pcept}$ value.

In an example, the generator G can be further trained by steps including receiving, by an encoder E, the target high resolution image Y; receiving, by the encoder E, the generated high resolution image G(Z), where the discriminator, D, of the GAN is trained to distinguish which of the G(Z) and Y is generated data; training the encoder E to minimize a difference between a first latent space representation E(G(Z)) of the generated high resolution image G(Z) and a second latent space representation E(Y) of the target high resolution image Y; and using the first latent space representation E(G(Z)) and the second latent space representation E(Y) to constrain the training of the generator G.

For simplicity of explanation, the techniques 600 of FIG. 6 and 800 of FIG. 8 are depicted and described as a series of steps. However, steps in accordance with this disclosure can occur in various orders, concurrently, and/or iteratively. Additionally, steps in accordance with this disclosure may occur with other steps not presented and described herein. Furthermore, not all illustrated steps may be required to implement a technique in accordance with the disclosed subject matter.

The implementations herein may be described in terms of functional block components and various processing steps. The disclosed processes and sequences may be performed alone or in any combination. Functional blocks may be realized by any number of hardware and/or software components that perform the specified functions. For example, the described implementations may employ various integrated circuit components, e.g., memory elements, processing elements, logic elements, look-up tables, and the like, which may carry out a variety of functions under the control of one or more microprocessors or other control devices. Similarly, where the elements of the described implementations are implemented using software programming or software elements the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the implementations of the disclosure could employ any number of conventional techniques for electronics configuration, signal processing and/or control, data processing and the like.

Aspects or portions of aspects of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an aspect" or "one aspect" throughout is not intended to mean the same implementation or aspect unless described as such.

The particular aspects shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device.

The use of "including" or "having" and variations thereof herein is meant to encompass the items listed thereafter and equivalents thereof as well as additional items. Unless specified or limited otherwise, the terms "mounted," "connected," 'supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the disclosure (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed.

The above-described implementations have been described in order to allow easy understanding of the present disclosure and do not limit the present disclosure. To the contrary, the disclosure is intended to cover various modifications and equivalent arrangements included within the scope of the appended claims, which scope is to be accorded the broadest interpretation so as to encompass all such modifications and equivalent structure as is permitted under the law.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method of training a generator G of a Generative Adversarial Network (GAN), comprising:
    generating a real contextual data set $\{x_1, \ldots, x_N\}$ for a high resolution image Y,
        wherein the real contextual data set $\{x_1, \ldots, x_N\}$ is generated by inputting the high resolution image Y to a convolutional neural network (CNN) and obtaining first feature maps from at least one convolution layer of the CNN, the first feature maps constituting the real contextual data set $\{x_1, \ldots, x_N\}$;
    generating a generated contextual data set $\{g_1, \ldots, g_N\}$ for a generated high resolution image G(Z),
        wherein the generated high resolution image G(Z) is generated by the generator G of the GAN in response to receiving an input Z,
        wherein the input Z is a random sample that corresponds to the high resolution image Y, and
        wherein the generated contextual data set $\{g_1, \ldots, g_N\}$ is generated by inputting the generated high resolution image G(Z) to the (CNN) and obtaining second feature maps from the at least one convolution layer of the CNN, the second feature maps constituting the generated contextual data set $\{g_1, \ldots, g_N\}$;
    calculating a perceptual loss $L_{pcept}$ value using the real contextual data set $\{x_i, \ldots, x_N\}$ and the generated contextual data set $\{g_1, \ldots, g_N\}$; and
    training the generator G using the perceptual loss $L_{pcept}$ value.

2. The method of claim 1, wherein training the generator G using the perceptual loss $L_{pcept}$ value comprises:
    incorporating the perceptual loss $L_{pcept}$ value into a loss function of the generator G.

3. The method of claim 2, wherein incorporating the perceptual loss $L_{pcept}$ value into the loss function of the generator G comprising:
    updating the generator G by descending, for m samples, a gradient $$\nabla_{\theta_G} \frac{1}{m} \sum_{i=1}^{m} [\log((1 - D_{\theta_D}(G_{\theta_G}(z_i))) + \mu_1 * |y_i - G_{\theta_G}(z_i)| + \mu * L_{pcept}(G_{\theta_G}(z_i), y_i)],$$

wherein
    $y_i$ is a target sample,
    $z_i$ is a random sample that corresponds to the target sample $y_i$,
    $G_{\theta_D}(z_i)$ is an output of the of the generator G given current weight values $\theta_G$ of the generator G and the random sample $z_i$ as input,
    $D_{\theta_D}(G_{\theta_G}(z_i))$ is an output of the of a discriminator D given current weight values $\theta_D$ of the discriminator D and the output $G_{\theta_G}(z_i)$ of the of the generator G as input to the discriminator D,
    $\mu_1$ and $\mu$ are non-negative hyperparameters, and
    $L_{pcept}(G_{\theta_G}(z_i), y_i)$ is a perceptual loss value between the output of the of the generator G and the target sample.

4. The method of claim 1, wherein the real contextual data set $\{x_i, x_N\}$ is generated using a neural network, and wherein the generated contextual data set $\{g_1, \ldots, g_N\}$ is generated using the neural network.

5. The method of claim 1, wherein calculating the perceptual loss $L_{pcept}$ value comprises:
    calculating structure similarities between each $x_i$ and each $g_j$;
    calculating respective structure distances for the structure similarities; and
    calculating respective structure distances for the structure similarities; and
    calculating the perceptual loss $L_{pcept}$ value using the structure distances.

6. The method of claim 5, wherein calculating the structure similarities between each $x_i$ and $g_j$ comprises:
    calculating a cosine similarity between an $x_i$ and a $g_j$ using a reference point.

7. The method of claim 6, wherein the reference point comprises at least one of a first average $\bar{g}$ of the generated contextual data set $\{g_1, \ldots, g_N\}$ or a second average $\bar{x}$ of the real contextual data set $\{x_1, \ldots, x_N\}$.

8. The method of claim 6, wherein the reference point is one of a generated contextual data element of the generated contextual data set $\{g_1, \ldots, g_N\}$, a real contextual data element of the real contextual data set $\{x_1, \ldots, x_N\}$, or a combination of the generated contextual data element and the real contextual data element.

9. The method of claim 5, wherein calculating the respective structure distances for the structure similarities comprising:
calculating a structure similarity $d_{ij}$ for a structure similarity $c_{ij}$ between an $x_i$ and a $g_j$ using $d_{ij}=(1-c_{ij})/2$, wherein
$d_{ij}$ is the structure similarity between a generated context datum $g_i$ and a real context datum $x_1$, and
$c_{ij}$ is a structure similarity that is calculated using one of:
a first formula $$c_{ij} = \begin{cases} \frac{(g_i - \bar{g})(x_j - \bar{x})}{\|g_i - \bar{g}\|_2 \|x_i - \bar{x}\|_2}, & \text{when } (g_i - \bar{g}) \neq 0 \text{ and } (x_j - \bar{x}) \neq 0 \\ 0, & \text{otherwise} \end{cases} \text{; or}$$

a second formula $$c_{ij} = \begin{cases} \frac{(g_i - r)(x_j - r)}{\|g_i - r\|_2 \|x_i - r\|_2}, & \text{when } (g_i - r) \neq 0 \text{ and } (x_j - r) \neq 0 \\ 0, & \text{otherwise} \end{cases},$$

wherein
$\bar{g}$ is an average of the generated contextual data set $\{g_i, \ldots, g_N\}$,
$\bar{x}$ is an average of the real contextual data set $\{x_1, \ldots, x_N\}$, and
r is a reference point.

10. The method of claim 5, wherein calculating the perceptual loss $L_{pcept}$ value using the structure similarities comprises:
determining, for each $g_i$ of the generated contextual data set $\{g_1, \ldots, g_N\}$, a respective maximum structure distance from among structure distances $d_{ij}$ between $g_i$ and each $x_j$ of the real contextual data set $\{x_1, \ldots, x_N\}$; and
calculating the perceptual loss $L_{pcept}$ value using the respective maximum structure distances.

11. The method of claim 1, further comprising:
receiving, by an encoder E, the high resolution image Y;
receiving, by the encoder E, a generated high resolution image G(Z), wherein a discriminator, D, of the GAN is trained to distinguish which of the G(Z) and Y is generated data;
training the encoder E to minimize a difference between a first latent space representation E(G(Z)) of the generated high resolution image G(Z) and a second latent space representation E(Y) of the high resolution image Y; and
using the first latent space representation E(G(Z)) and the second latent space representation E(Y) to constrain the training of the generator G.

12. The method of claim 11, further comprising:
updating the encoder E by descending, form sample pairs, a gradient $$\nabla_{\theta_E} \frac{1}{m} \Sigma_{i=1}^m |E_{\theta_E}(y_i) - E_{\theta_E}(G_{\theta_G}(z_i))|,$$

wherein $E_{\theta_E}(y_i)$ is a first output of the encoder E given first current weight values $\theta_E$ of the encoder E and a first input $y_i$,
wherein $G_{\theta_G}(z_i)$ is a second output of the of the generator G given second current weight values $\theta_G$ of the generator G and a second input $z_i$, and
wherein $E_{\theta_E}(G_{\theta_G}(z_i))$ is a third output of the of the encoder E given the first current weight values $\theta_E$ of the encoder E and $G_{\theta_{di}\ G}(z_i)$ as input.

13. The method of claim 11, wherein using the first latent space representation E(G(Z)) and the second latent space representation E(Y) to constrain the training of the generator G, comprising:
updating the generator G by descending, for m sample pairs, a gradient $$\nabla_{\theta_G} \frac{1}{m} \sum_{i=1}^m [\log(1 - D_{\theta_D}(G_{\theta_G}(z_i))) + \mu_1 * |y_i - G_{\theta_G}(z_i)| - \mu_2 * |E_{\theta_E}(y_i) - E_{\theta_E}(G_{\theta_G}(z_i))| + \mu * L_{pcept}(G_{\theta_G}(z_i), y_i)],$$

wherein
$y_i$ is a target sample,
$z_i$ is a random sample that corresponds to the target sample $y_i$,
$G_{\theta_G}(z_i)$ is an output of the of the generator G given current weight values $\theta_G$ of the generator G and the random sample z, as input,
$D_{\theta_D}(G_{\theta_G}(z_i))$ is an output of the of a discriminator D given current weight values $\theta_D$ of the discriminator D and the output $G_{\theta_G}(z_i)$ of the of the generator Gas input to the discriminator D,
$E_{\theta_E}(y_i)$ is the second latent space representation of the target sample $y_i$ given current weight values $\theta_E$ of the encoder E,
$E_{\theta_E}(G_{\theta_G}(z_i))$ is the first latent space representation of the output $G_{\theta_G}(z_i)$ of the generator G given the current weight values $\theta_E$ of the encoder E,
$\mu_1$, $\mu_2$, and $\mu$ are non-negative hyperparameters, and
$L_{pcept}(G_{\theta_G}(z_i), y_i)$ is a perceptual loss value between the output of the of the generator G and the target sample.

14. An apparatus for training a generator G of a Generative Adversarial Network (GAN), comprising:
a memory; and
a processor, the processor is configured to execute instructions stored in the memory to:
generate a real contextual data set $\{x_1, \ldots, x_N\}$ for a high resolution image Y,
wherein the real contextual data set $\{x_1, \ldots, x_N\}$ is generated by inputting the high resolution image Y to a convolutional neural network (CNN) and obtaining first feature maps from at least one convolution layer of the CNN, the first feature maps constituting the real contextual data set $\{x_1, \ldots, x_N\}$;

generate a generated contextual data set $\{g_i, \ldots, g_N\}$ for a generated high resolution image G(Z),
   wherein the generated high resolution image G(Z) is generated by the generator G of the GAN in response to receiving an input Z,
   wherein the input Z is a random sample that corresponds to the high resolution image Y, and
   wherein the generated contextual data set $\{g_i, \ldots, g_N\}$ is generated by inputting the generated high resolution image G(Z) to the (CNN) and obtaining second feature maps from the at least one convolution layer of the CNN, the second feature maps constituting the generated contextual data set $\{g_i, \ldots, g_N\}$;
calculate a perceptual loss $L_{pcept}$ value using the real contextual data set $\{x_1, \ldots, x_N\}$ and the generated contextual data set $\{g_1, \ldots, g_N\}$; and
train the generator G using the perceptual loss $L_{pcept}$ value.

15. The apparatus of claim 14, wherein to train the generator G using the perceptual loss $L_{pcept}$ value comprises to:
incorporate the perceptual loss $L_{pcept}$ value into a loss function of the generator G.

16. The apparatus of claim 14, wherein to calculate the perceptual loss $L_{pcept}$ value comprises to:
calculate structure similarities between each $x_i$ and each $g_j$;
calculate respective structure distances for the structure similarities; and
calculate the perceptual loss $L_{pcept}$ value using the structure distances.

17. The apparatus of claim 16, wherein to calculate the structure similarities between each $x_i$ and $g_j$ comprises to:
calculate a cosine similarity between an $x_i$ and a $g_j$ using a reference point.

18. The apparatus of claim 14, wherein the instructions further comprise instructions to:
receive, by an encoder E, the high resolution image Y;
receive, by the encoder E, a generated high resolution image G(Z), wherein a discriminator, D, of the GAN is trained to distinguish which of the G(Z) and Y is generated data;
train the encoder E to minimize a difference between a first latent space representation E(G(Z)) of the generated high resolution image G(Z) and a second latent space representation E(Y) of the high resolution image Y; and
use the first latent space representation E(G(Z)) and the second latent space representation E(Y) to constrain the training of the generator G.

19. A method for generating a super resolution image, comprising:
receiving, by a generator G, an input corresponding to a low resolution image; and
outputting, from the generator G, the super resolution image corresponding to the low resolution image, wherein the generator G is trained using a Generative Adversarial Network (GAN) by steps comprising:
   generating a real contextual data set $\{x_1, \ldots, x_N\}$ for a target high resolution image Y,
      wherein the real contextual data set $\{x_1, \ldots, x_N\}$ is generated by inputting the high resolution image Y to a convolutional neural network (CNN) and obtaining first feature maps from at least one convolution layer of the CNN, the first feature maps constituting the real contextual data set $\{x_1, \ldots, x_N\}$;
   generating a generated contextual data set $\{g_i, \ldots, g_N\}$ for a generated high resolution image G(Z), wherein the generated high resolution image G(Z) is generated by the generator G of the GAN in response to receiving an input Z that corresponds to the target high resolution image Y, and
      wherein the generated contextual data set $\{g_i, \ldots, g_N\}$ is generated by inputting the generated high resolution image G(Z) to the (CNN) and obtaining second feature maps from the at least one convolution layer of the CNN, the second feature maps constituting the generated contextual data set $\{g_i, \ldots, g_N\}$;
   calculating a perceptual loss $L_{pcept}$ value using the real contextual data set $\{x_1, \ldots, x_N\}$ and the generated contextual data set $\{g_i, \ldots, g_N\}$; and
   training the generator G using the perceptual loss $L_{pcept}$ value.

20. The method of claim 19, wherein the generator G is further trained by steps comprising:
receiving, by an encoder E, the target high resolution image Y;
receiving, by the encoder E, the generated high resolution image G(Z), wherein a discriminator, D, of the GAN is trained to distinguish which of the G(Z) and Y is generated data;
training the encoder E to minimize a difference between a first latent space representation E(G(Z)) of the generated high resolution image G(Z) and a second latent space representation E(Y) of the target high resolution image Y; and
using the first latent space representation E(G(Z)) and the second latent space representation E(Y) to constrain the training of the generator G.

* * * * *